United States Patent
Ebihara et al.

(10) Patent No.: US 9,125,341 B2
(45) Date of Patent: Sep. 8, 2015

(54) MOWER DECK WITH RELATIVE BLADE SPEED CONTROL FOR UNIFORM DISCHARGE OF MOWN GRASS

(75) Inventors: Tomoyuki Ebihara, Osaka (JP);
Masafumi Yasaka, Osaka (JP)

(73) Assignee: YANMAR CO., LTD., Osaka (JP)

( * ) Notice: Subject to any disclaimer, the term of this patent is extended or adjusted under 35 U.S.C. 154(b) by 79 days.

(21) Appl. No.: 13/882,957

(22) PCT Filed: Aug. 23, 2011

(86) PCT No.: PCT/JP2011/068947
§ 371 (c)(1),
(2), (4) Date: May 1, 2013

(87) PCT Pub. No.: WO2012/098723
PCT Pub. Date: Jul. 26, 2012

(65) Prior Publication Data
US 2013/0212995 A1    Aug. 22, 2013

(30) Foreign Application Priority Data

Jan. 19, 2011 (JP) .................................. 2011-009072
May 12, 2011 (JP) .................................. 2011-107523

(51) Int. Cl.
| | | |
|---|---|---|
| *A01D 87/10* | (2006.01) | |
| *A01D 34/66* | (2006.01) | |
| *A01D 34/78* | (2006.01) | |
| *A01D 34/00* | (2006.01) | |
| *A01D 34/71* | (2006.01) | |

(52) U.S. Cl.
CPC ............ *A01D 34/668* (2013.01); *A01D 34/006* (2013.01); *A01D 34/667* (2013.01); *A01D 34/71* (2013.01); *A01D 34/78* (2013.01)

(58) Field of Classification Search
USPC ....... 56/10.2 R, 10.2 A, 10.2 G, 10.2 H, 10.6, 56/10.7, 11.1, 13.3, 13.5, 13.6; 701/50
See application file for complete search history.

(56) References Cited

U.S. PATENT DOCUMENTS

| 5,511,368 A * | 4/1996 | Kocher ......................... 56/15.2 |
| 6,138,444 A * | 10/2000 | Torras, Sr. ......................... 56/6 |
| 6,360,517 B1 | 3/2002 | Ishimori et al. |

(Continued)

FOREIGN PATENT DOCUMENTS

| JP | 7-26899 Y2 | 6/1995 |
| JP | 11-509798 A | 8/1999 |

(Continued)

*Primary Examiner* — Alicia Torres
(74) *Attorney, Agent, or Firm* — Birch, Stewart, Kolasch & Birch, LLP

(57) ABSTRACT

A riding mower including two mower blades that rotate to mow grass and generate air flows, the two mower blades including a left mower blade and a right mower blade, a mower deck, two motors that rotate the respective mower blades and a controller is provided. The left and right mower blades being provided adjacent to each other and one of the left and right mower blades being disposed obliquely in front of the other mower blade. The riding mower generates a combined air flow and discharges mowed grass to the outside of the mower deck together with the combined air flow. The controller controls such that a difference between the rotational speeds of the left and right mower blades is changed at a predetermined period and the mowed grass is discharged to the rear of the mower deck uniformly in a lateral direction of the mower deck.

15 Claims, 29 Drawing Sheets

(56) References Cited

U.S. PATENT DOCUMENTS

| | | | |
|---|---|---|---|
| 6,591,593 B1 * | 7/2003 | Brandon et al. | 56/10.6 |
| 8,136,333 B1 * | 3/2012 | Levin et al. | 56/16.7 |
| 2002/0083694 A1 | 7/2002 | Nagai et al. | |

FOREIGN PATENT DOCUMENTS

| | | |
|---|---|---|
| JP | 2000-262124 A | 9/2000 |
| JP | 2001-45826 A | 2/2001 |

* cited by examiner

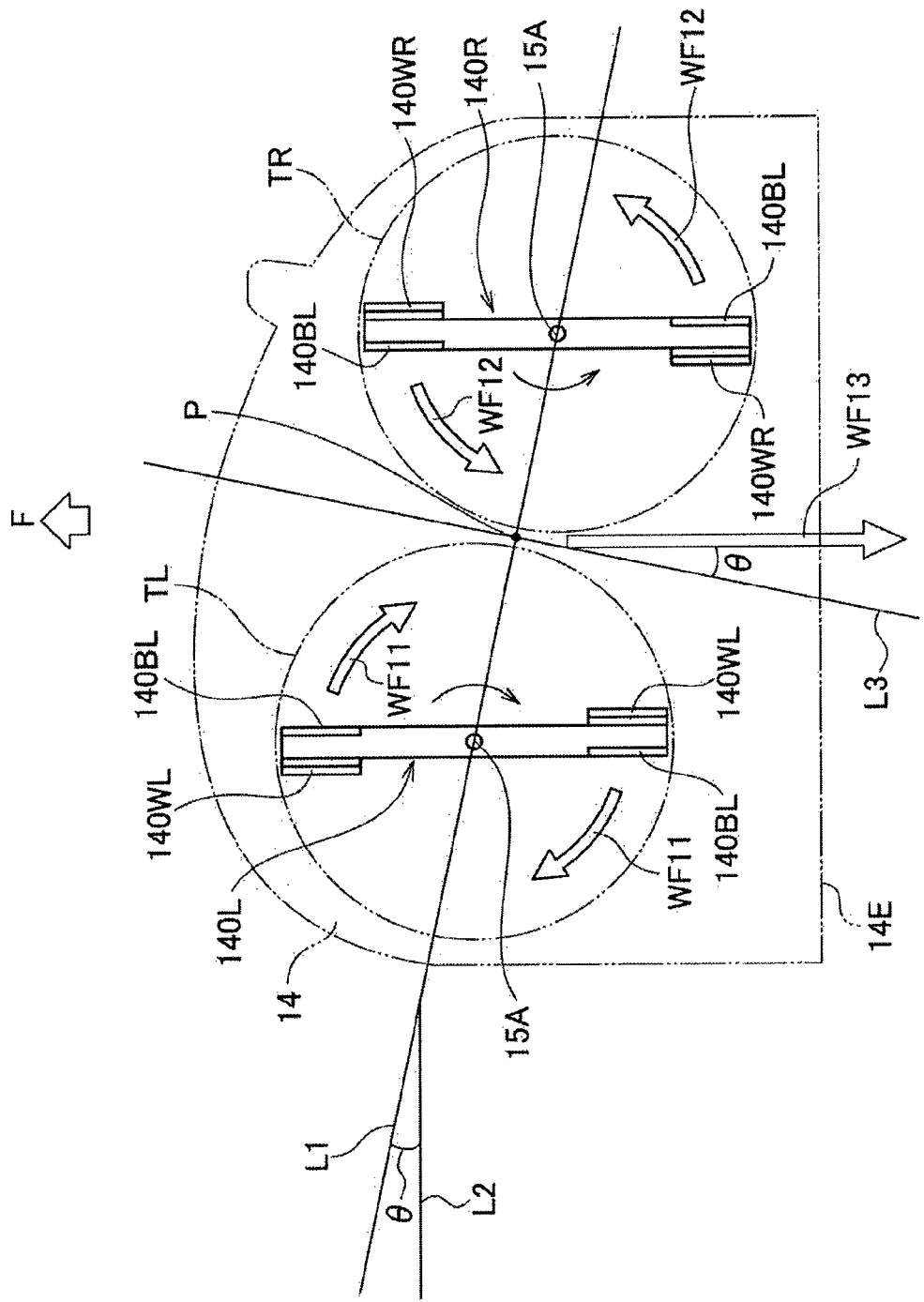

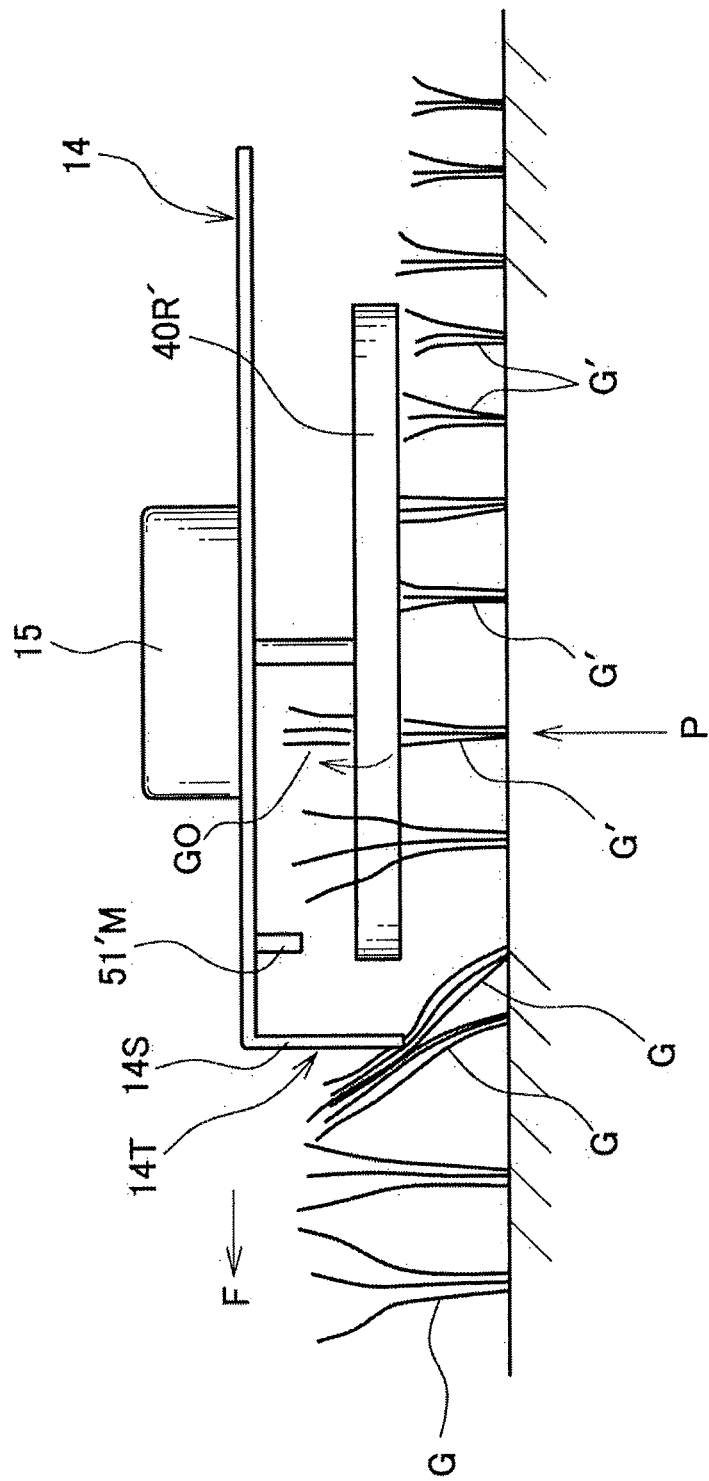

MOWER DECK WITH RELATIVE BLADE SPEED CONTROL FOR UNIFORM DISCHARGE OF MOWN GRASS

TECHNICAL FIELD

The present invention relates to a riding mower that includes two (left and right) mower blades rotating to mow grass and generate air flows, a mower deck covering the two mower blades from above, and two motors rotating the respective mower blades.

BACKGROUND ART

In the past, as disclosed in, for example, JP 11-509798 W, a riding lawn mower (riding mower) has mowed the lawn by rotating two mower blades, which are provided in a mower deck so as to be substantially horizontally rotatable, by the power of an engine. Further, the riding lawn mower has been adapted to discharge the mowed lawn rearward.

SUMMARY OF INVENTION

Technical Problem

The two (left and right) mower blades are adapted to mow the lawn by rotating at a high speed toward the inside of a body of the lawn mower, to generate an air flow rearward in the mower deck, and to discharge the mowed lawn from the rear of the mower deck together with the air flow. In general, the two mower blades are disposed in the body of the lawn mower so that one of the mower blades is positioned obliquely in front of the other mower blade. For this reason, the direction of a tangent line of two paths of rotation of the two mower blades at a position where the paths of rotation of the two mower blades are closest to each other has a constant angle with respect to a vehicle width direction of the lawn mower. The air flows, which are generated by the two mower blades, are combined with each other at the position where the paths of rotation are closest to each other, so that a combined air flow is generated and directed to the rear. This combined air flow substantially corresponds to the direction of the tangent line of two paths of rotation of the two mower blades. Accordingly, there has been a problem in that mowed lawn may not be discharged in a desired direction, particularly, to the right behind of the lawn mower.

Accordingly, an object of the invention is to provide a riding mower that can discharge mowed grass in a desired direction.

Solution to Problem

For this purpose, according to a first aspect of the invention, there is provided a riding mower including two (left and right) mower blades that rotate to mow grass and generate air flows, a mower deck that covers the two mower blades from above, and two motors that rotate the respective mower blades. The left and right mower blades are provided adjacent to each other and one of the left and right mower blades is disposed obliquely in front of the other mower blade. The riding mower rotates the left mower blade clockwise and rotates the right mower blade counterclockwise in a plan view; generates a combined air flow, which is directed to the rear from the front, in the mower deck at a position where the paths of rotation of the two mower blades are closest to each other; and discharges mowed grass to the outside of the mower deck together with the combined air flow. The rotational speed of the forward mower blade is set to be higher than the rotational speed of the rearward mower blade, so that the speed of air flow generated by the forward mower blade becomes higher than the speed of air flow generated by the rearward mower blade, the combined air flow is generated, and the mowed grass is discharged to the rear of the mower deck.

According to a second aspect of the invention, there is provided a riding mower including two (left and right) mower blades that rotate to mow grass and generate air flows, a mower deck that covers the two mower blades from above; and two motors that rotate the respective mower blades, the left and right mower blades being provided adjacent to each other and one of the left and right mower blades being disposed obliquely in front of the other mower blade, the riding mower rotating the left mower blade clockwise and rotating the right mower blade counterclockwise in a plan view, generating a combined air flow, which is directed to the rear from the front, in the mower deck at a position where the paths of rotation of the two mower blades are closest to each other, and discharging mowed grass to the outside of the mower deck together with the combined air flow, wherein the forward mower blade is provided with wings, so that the amount of air flow generated by the forward mower blade becomes larger than the amount of air flow generated by the rearward mower blade, the combined air flow is generated, and the mowed grass is discharged to the rear of the mower deck.

According to a third aspect of the invention, there is provided a riding mower including two (left and right) mower blades that rotate to mow grass and generate air flows, a mower deck that covers the two mower blades from above, and two motors that rotate the respective mower blades, the left and right mower blades being provided adjacent to each other and one of the left and right mower blades being disposed obliquely in front of the other mower blade, the riding mower rotating the left mower blade clockwise and rotating the right mower blade counterclockwise in a plan view, generating a combined air flow, which is directed to the rear from the front, in the mower deck at a position where the paths of rotation of the two mower blades are closest to each other, and discharging mowed grass to the outside of the mower deck together with the combined air flow, wherein the two mower blades are provided with wings, and the wings of the respective mower blades are formed in different shapes, so that the amount of air flow generated by the wings of the forward mower blade becomes larger than the amount of air flow generated by the wings of the rearward mower blade, the combined air flow is generated, and the mowed grass is discharged to the rear of the mower deck.

According to a fourth aspect of the invention, there is provided riding mower including two (left and right) mower blades that rotate to mow grass and generate air flows, a mower deck that covers the two mower blades from above; and two motors that rotate the respective mower blades, the left and right mower blades being provided adjacent to each other and one of the left and right mower blades being disposed obliquely in front of the other mower blade, the riding mower rotating the left mower blade clockwise and rotating the right mower blade counterclockwise in a plan view, generating a combined air flow, which is directed to the rear from the front, in the mower deck at a position where the paths of rotation of the two mower blades are closest to each other, and discharging mowed grass to the outside of the mower deck together with the combined air flow. The riding mower further includes a controller, wherein the controller controls such that a difference between the rotational speeds of the left and right mower blades is changed at a predetermined period, and the mowed grass is discharged uniformly in a lateral direction.

According to a fifth aspect of the invention, the riding mower according to the fourth aspect of the invention includes an adjusting unit that can change the period.

According to a sixth aspect of the invention, in the riding mower according to the fourth or fifth aspect of the invention, the rotational speed of the one mower blade is periodically changed and the rotational speed of the other mower blade is constant, so that the difference between the rotational speeds of the left and right mower blades may be changed at a predetermined period.

According to a seventh aspect of the invention, in the riding mower according to the fourth or fifth aspect of the invention, the rotational speeds of both the left and right mower blades are periodically changed, so that the difference between the rotational speeds of the left and right mower blades may be changed at a predetermined period.

According to an eighth aspect of the invention, the riding mower according to any one of the first to seventh aspects of the invention, further includes a battery, wherein the riding mower travels by the battery, the two motors, which rotate the mower blades, are driven by the battery, and the motors are placed on the mower deck.

According to an eighth aspect of the invention, the riding mower according to any one of the first to seventh aspects of the invention, further includes an engine, wherein the riding mower travels by the engine, and the two motors, which rotate the mower blades, are hydraulic motors that are driven by the engine.

Advantageous Effects of Invention

According to the first aspect of the invention, there is provided the riding mower including two (left and right) mower blades that rotate to mow grass and generate air flows, a mower deck that covers the two mower blades from above, and two motors that rotate the respective mower blades. The left and right mower blades are provided adjacent to each other and one of the left and right mower blades is disposed obliquely in front of the other mower blade. The riding mower rotates the left mower blade clockwise and rotates the right mower blade counterclockwise in a plan view; generates a combined air flow, which is directed to the rear from the front, in the mower deck at a position where the paths of rotation of the two mower blades are closest to each other; and discharges mowed grass to the outside of the mower deck together with the combined air flow. In addition, the rotational speed of the forward mower blade is set to be higher than the rotational speed of the rearward mower blade, so that the speed of air flow generated by the forward mower blade becomes higher than the speed of air flow generated by the rearward mower blade, the combined air flow is generated, and the mowed grass is discharged to the rear of the mower deck.

For this reason, since the relatively fast air flow generated by the forward mower blade is combined with the relatively slow air flow generated by the rearward mower blade, the combined air flow can be directed to the right behind. Accordingly, it is possible to provide the riding mower of which the structures of the mower blades are not complicated since only the rotational speeds of the left and right mower motors are controlled and which can discharge mowed grass in a desired direction.

According to the second aspect of the invention, there is provided the riding mower including two (left and right) mower blades that rotate to mow grass and generate air flows, a mower deck that covers the two mower blades from above, and two motors that rotate the respective mower blades. The left and right mower blades are provided adjacent to each other and one of the left and right mower blades is disposed obliquely in front of the other mower blade. The riding mower rotates the left mower blade clockwise and rotates the right mower blade counterclockwise in a plan view; generates a combined air flow, which is directed to the rear from the front, in the mower deck at a position where the paths of rotation of the two mower blades are closest to each other; and discharges mowed grass to the outside of the mower deck together with the combined air flow. In addition, the forward mower blade is provided with wings, so that the amount of air flow generated by the forward mower blade becomes larger than the amount of air flow generated by the rearward mower blade, the combined air flow is generated, and the mowed grass is discharged to the rear of the mower deck.

For this reason, since the relatively large amount of air flow generated by the forward mower blade is combined with the air flow generated by the rearward mower blade, the combined air flow can be directed to the right behind. Accordingly, it is possible to provide the riding mower that can discharge mowed grass in a desired direction.

According to the third aspect of the invention, there is provided the riding mower including two (left and right) mower blades that rotate to mow grass and generate air flows, a mower deck that covers the two mower blades from above, and two motors that rotate the respective mower blades. The left and right mower blades are provided adjacent to each other and one of the left and right mower blades is disposed obliquely in front of the other mower blade. The riding mower rotates the left mower blade clockwise and rotates the right mower blade counterclockwise in a plan view; generates a combined air flow, which is directed to the rear from the front, in the mower deck at a position where the paths of rotation of the two mower blades are closest to each other; and discharges mowed grass to the outside of the mower deck together with the combined air flow. In addition, the two mower blades are provided with wings and the wings of the respective mower blades are formed in different shapes, so that the amount of air flow generated by the wings of the forward mower blade becomes larger than the amount of air flow generated by the wings of the rearward mower blade, the combined air flow is generated, and the mowed grass is discharged to the rear of the mower deck.

Accordingly, since the two mower blades are provided with wings and the wings of the respective mower blades are formed in different shapes, the amount of air flow generated by the wings of the forward mower blade becomes larger than the amount of air flow generated by the wings of the rearward mower blade. Therefore, it is possible to increase the amount of air flow generated by the two mower blades. As a result, it is possible to increase the amount of the combined air flow. Accordingly, it is possible to discharge mowed grass in a desired direction and to discharge mowed grass further.

According to the fourth aspect of the invention, there is provided the riding mower including two (left and right) mower blades that rotate to mow grass and generate air flows, a mower deck that covers the two mower blades from above, and two motors that rotate the respective mower blades. The left and right mower blades are provided adjacent to each other and one of the left and right mower blades is disposed obliquely in front of the other mower blade. The riding mower rotates the left mower blade clockwise and rotates the right mower blade counterclockwise in a plan view; generates a combined air flow, which is directed to the rear from the front, in the mower deck at a position where the paths of rotation of the two mower blades are closest to each other; and discharges mowed grass to the outside of the mower deck together with the combined air flow. The riding mower further includes a controller, and the controller controls such that a difference between the rotational speeds of the left and right mower blades is changed at a predetermined period, and the mowed grass is discharged uniformly in a lateral direction.

Accordingly, it is possible to provide a riding mower that can discharge mowed grass in a desired direction. In particular, it is possible to uniformly discharge mowed grass to the rear. As in the riding mowers having been described until now, the mowed grass is not discharged to the rear of the riding mower in a constant direction, so that the ridge of mowed grass may not be formed in the rear of the riding mower. Accordingly, the mowed grass is easily dried and the growth of grass positioned under the mowed grass is not hindered.

According to the fifth aspect of the invention, since the riding mower includes an adjusting unit that can change the period, it is possible to change the period of the discharge of the mowed grass uniformly in a lateral direction. Accordingly, a period can be shortened when the travel speed of the riding mower is increased and mowing is performed, and a period can be lengthened when the travel speed of the riding mower is reduced and mowing is performed. Therefore, it is possible to make the thickness of mowed grass, which is to be discharged, constant regardless of the travel speed of the mower.

According to the sixth aspect of the invention, the rotational speed of the one mower blade is periodically changed and the rotational speed of the other mower blade is constant, so that the difference between the rotational speeds of the left and right mower blades is changed at a predetermined period. Accordingly, since only the rotational speed of one mower blade may be controlled so as to be periodically increased or reduced, it is possible to simplify the internal structure of the controller.

According to the seventh aspect of the invention, the rotational speeds of both the left and right mower blades are periodically changed, so that the difference between the rotational speeds of the left and right mower blades is changed at a predetermined period. Accordingly, it is easy to more significantly change the difference between the rotational speeds of the left and right mower blades in a short time as compared to a case where the rotational speed of one mower blade is periodically changed. Therefore, it is easy to form a short period and it is possible to increase a discharge distance.

According to the eighth aspect of the invention, the riding mower further includes a battery and travels by the battery, the two motors rotating the mower blades are driven by the battery, and the motors are placed on the mower deck.

Accordingly, exhaust gas caused by the combustion of an engine is not generated unlike an engine-driven riding mower. Therefore, it is possible to contribute to the improvement of an environmental problem such as the prevention of global warming.

According to the ninth aspect of the invention, the riding mower further includes an engine and travels by the engine, and the two motors rotating the mower blades are hydraulic motors that are driven by the engine.

Accordingly, it is possible to manufacture a riding mower having avoided problems that are caused when the riding mower is electrically driven, such as the increase of the weight of the battery, the limitation on a battery charge station, and the malfunction of a motor, a battery, or the like that is caused by the heating of electrical components controlling the motor, the battery, or the like.

BRIEF DESCRIPTION OF DRAWINGS

FIG. 6A is a perspective view, FIG. 6B is a side view seen in the direction of an arrow A of FIG. 6A, FIG. 6C is a plan view.

FIG. 8 is a diagram illustrating an air flow in a mower deck of an electric lawn mower of a second embodiment.

FIG. 9 is a perspective view of mower blade of an electric lawn mower of a third embodiment.

FIG. 19 is a diagram illustrating the structure of another example of the mower deck.

FIG. 20 is a diagram illustrating that the lawn is mowed by the mower deck, and is a diagram when the cross-section of the mower deck formed at a straight line L3 of FIG. 19A is seen from the right side.

DESCRIPTION OF EMBODIMENTS

Figure 1:
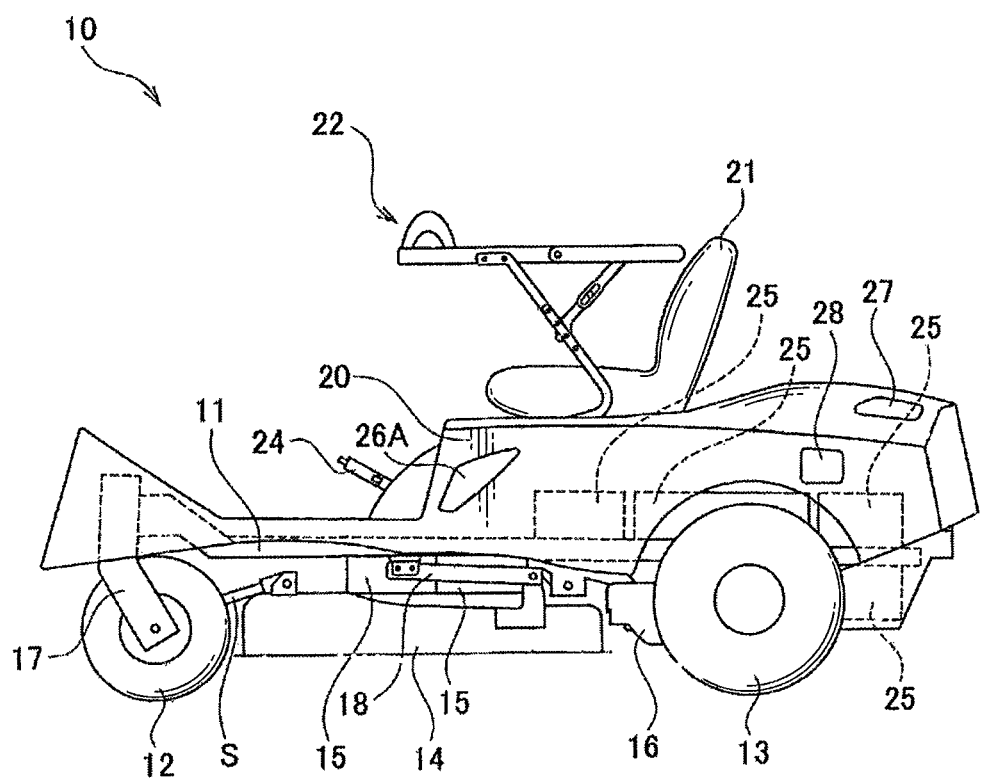
FIG. 1 is a side view of an electric lawn mower as a first embodiment of a riding mower of the invention.
Figure 2:
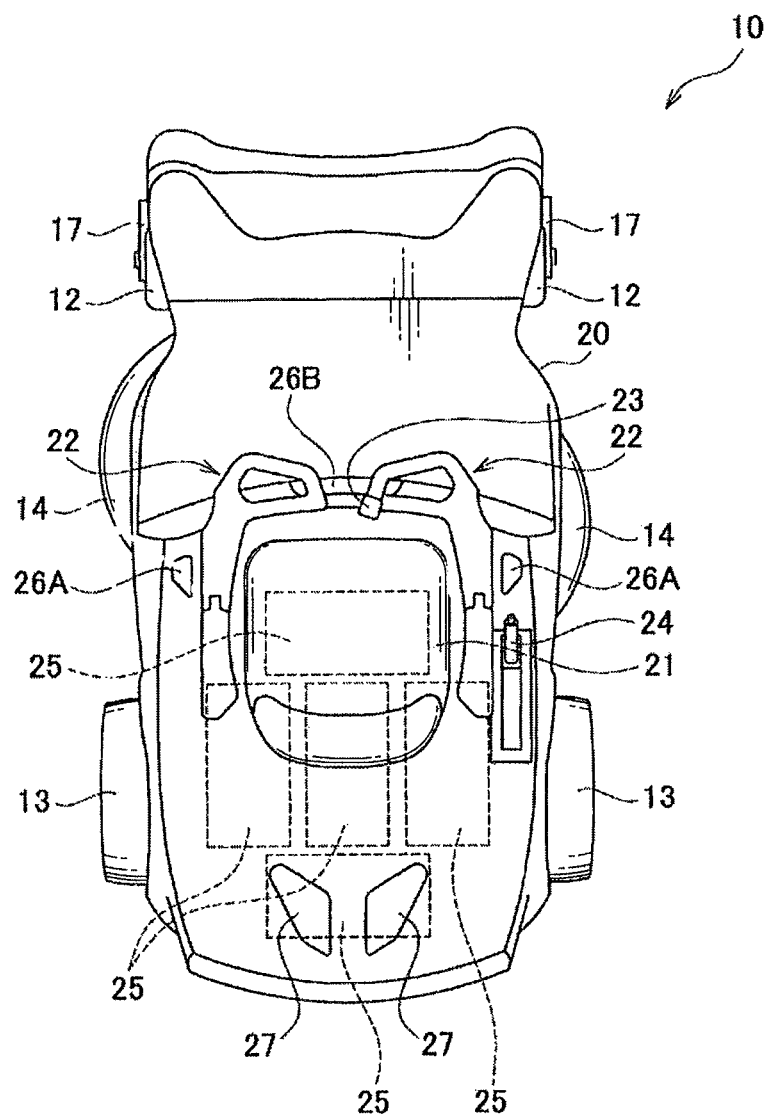
FIG. 2 is a plan view of FIG. 1.

Preferred embodiments of the invention will be described in detail below with reference to the drawings. A plan view and a left side view of an electric lawn mower 10 as a first embodiment of a riding mower of the invention are illustrated in FIG. 1 and FIG. 2, respectively. The electric lawn mower 10 includes a pair of (left and right) frame-like chassis 11 and a pair of front tires 12 and a pair of rear tires 13 that are provided below the chassis 11. Further, a mower deck 14 is provided between the front and rear tires 12 and 13. Two mower blades (not illustrated) are provided in the mower deck 14 so as to be adjacent to each other. Output shafts of separate mower motors (motors) 15 are mounted on the rotation centers of the two mower blades, respectively.

A cowl 20 covers the chassis 11. The cowl 20 covers the entire chassis 11. A driver's seat 21 is provided on the cowl 20 slightly in front of the rear tires 13. Travel operation levers 22 and 22, which are used to make the electric lawn mower 10 travel, are provided on the left and right sides of the driver's seat 21, respectively. A lift operation lever 24, which is used to adjust the height of the mower deck 14 from the ground, is provided on the outside of the right travel operation lever 22. Cooling ports 26A and 26A are provided below the driver's seat 21 on the left and right sides of the driver's seat 21, respectively, and a cooling port 26B is provided below the driver's seat 21 in front of the driver's seat 21. The cooling ports 26A and 26B are provided so that air is taken in through the cooling ports to cool batteries 25 to be described below. The cooling ports 26A and 26B are openings that are formed at the cowl 20. Further, two exhaust ports 27 are provided in the rear of the driver's seat 21. The exhaust ports 27 and 27 are provided so that the air taken in from the cooling ports 26A and 26B passes through a vehicle body and is discharge to the outside. The exhaust ports 27 and 27 are openings that are formed at the cowl 20.

Travel motors 16 are provided inside the pair of rear tires 13 and 13, respectively, and the rear tires 13 and 13 are driven by the travel motors 16 (Meanwhile, the travel motors 16 may be provided in the wheels of the rear tires 13 and 13 as in-wheel motors, respectively).

Electric power for the above-mentioned two mower motors 15 and the above-mentioned two travel motors 16 is supplied from the same batteries 25. Six batteries 25 are provided below the driver's seat 21 in the cowl 20. In detail, three batteries 25 are provided side by side (in the direction orthogonal to the direction where the electric lawn mower 10 goes straight) on the chassis 11 between the axles of the rear tires 13 and 13, one battery is provided in front of these three batteries 25 so as to be orthogonal to the three batteries 25, and one battery is provided in the rear thereof so as to be orthogonal to the three batteries 25. In addition, one battery 25 is provided under the chassis 11 in the rear of the rear tires 13 and 13 so as to be orthogonal to the travel direction. These six batteries 25 are fixed to the chassis 11 by brackets (not illustrated). Meanwhile, three batteries 25 are connected in series as one set, and two sets of batteries are provided in this embodiment. Accordingly, the number of batteries 25 may be three. In this case, three batteries are provided on the chassis 11 side by side (in the direction orthogonal to the direction where the electric lawn mower 10 goes straight).

A fender of the left rear tire 13 is provided with a power supply port 28 into which a plug is inserted when the batteries 25 are charged. The power supply port 28 is an opening that is formed at the cowl 20 (a power supply port-door for closing the opening is provided). A power supply plug is provided in the power supply port 28. The power supply plug is to be used to charge the batteries 25 with home electric power or the like while an electric cord is inserted therein. An AC adapter and a charger are appropriately provided between the batteries 25 and the power supply plug.

A controller (not illustrated) is provided on the batteries 25. This controller controls the travel motors 16 of the electric lawn mower 10. The controller controls the rotation directions and the rotational speeds of the travel motor 16 according to the amount of the tilt (to be described below) of the travel operation levers 22. The controller also functions to control the rotation of the mower motor 15 and to correct the variation of the small voltages of the batteries 25 in addition to the control of the travel motor 16. Meanwhile, the rotation of the mower motor 15 is controlled so as to interlock with the rotational speed of the travel motor 16. That is, the rotational speed of the mower blade is also increased when the travel speed is increased, and the rotational speed of the mower blade is also reduced when the travel speed is reduced.

The front tires 12 and 12 are independently driven to rotate, and are mounted on front tire brackets 17 by shaft, respectively. The front tire brackets 17 are mounted so as to be perpendicularly rotatable relative to the chassis 11. The two front tire brackets 17 and 17 are independently driven to rotate.

The travel operation lever 22 is tiltably provided, and the travel motor 16 rotates in the forward direction when a driver tilts the travel operation lever 22 forward. Meanwhile, when the travel operation lever 22 is tilted rearward, the travel motor 16 rotates in the rearward direction. Moreover, the rotational speed of the travel motor 16 is changed according to the degree of the tilt of the travel operation lever 22. That is, the travel motor 16 rotates at a higher speed in the forward (rearward) direction when the travel operation lever 22 is significantly tilted forward (rearward), and the travel motor 16 rotates at a low speed in the forward (rearward) direction when the travel operation lever 22 is slightly tilted forward (rearward). The driver can make the electric lawn mower go straight or reverse and turn to the left or right, circle, or the like by appropriately operating the travel operation levers 22 and 22 forward or rearward.

Further, a mowing switch 23, which is used to simultaneously allow and stop the rotation of the two mower blades provided in the mower deck 14, is provided at the end portion of the right travel operation lever 22. A limit switch is used as the mowing switch 23. The mowing switch is turned on when a driver presses the mowing switch by a finger, and is turned off when a driver presses the mowing switch again.

One ends of deck support arms 18 and 18, which move up and down the mower deck 14, are rotatably mounted on the lower portions of the substantially middle portions of the left and right chassis 11 and 11. The other ends of the deck support arms 18 and 18 are mounted on the mower deck 14 by a stay 19a (and a stay 19a') to be described below.

Figure 3:
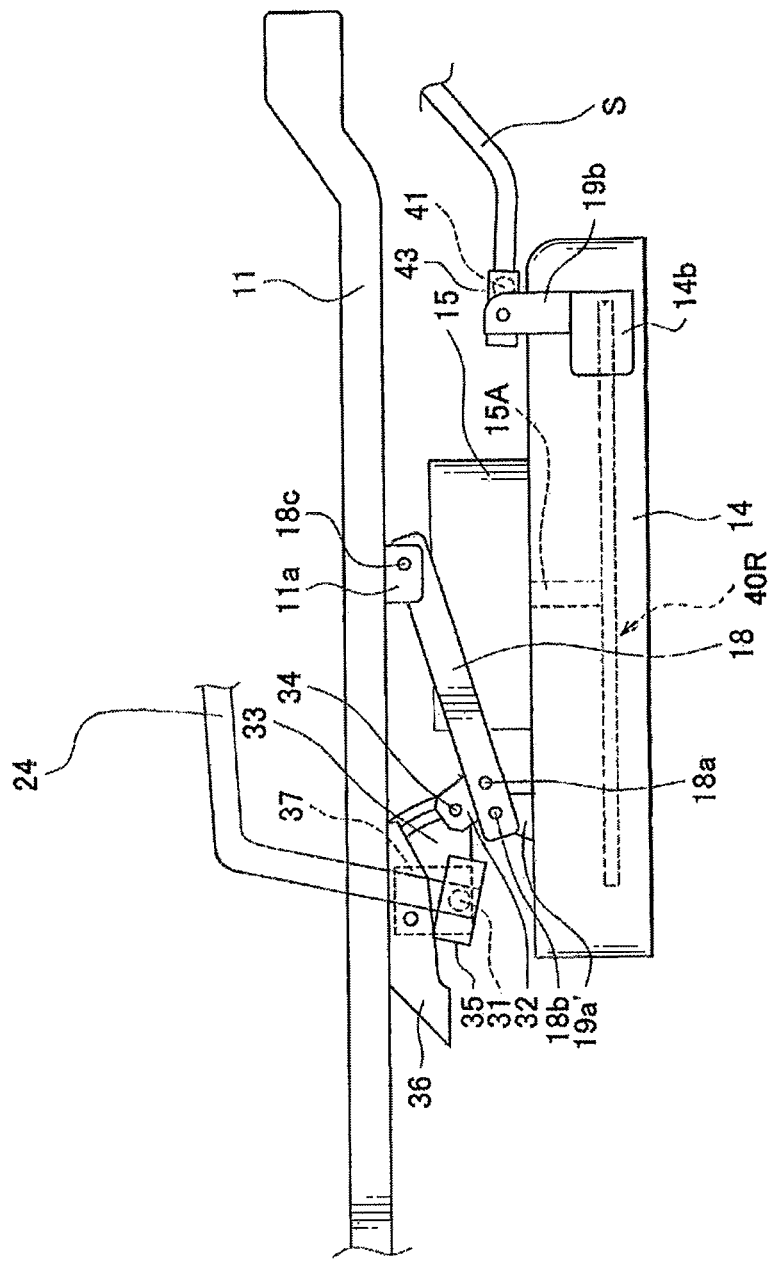
FIG. 3 is an enlarged side view of main parts of FIG. 1.
Figure 4:
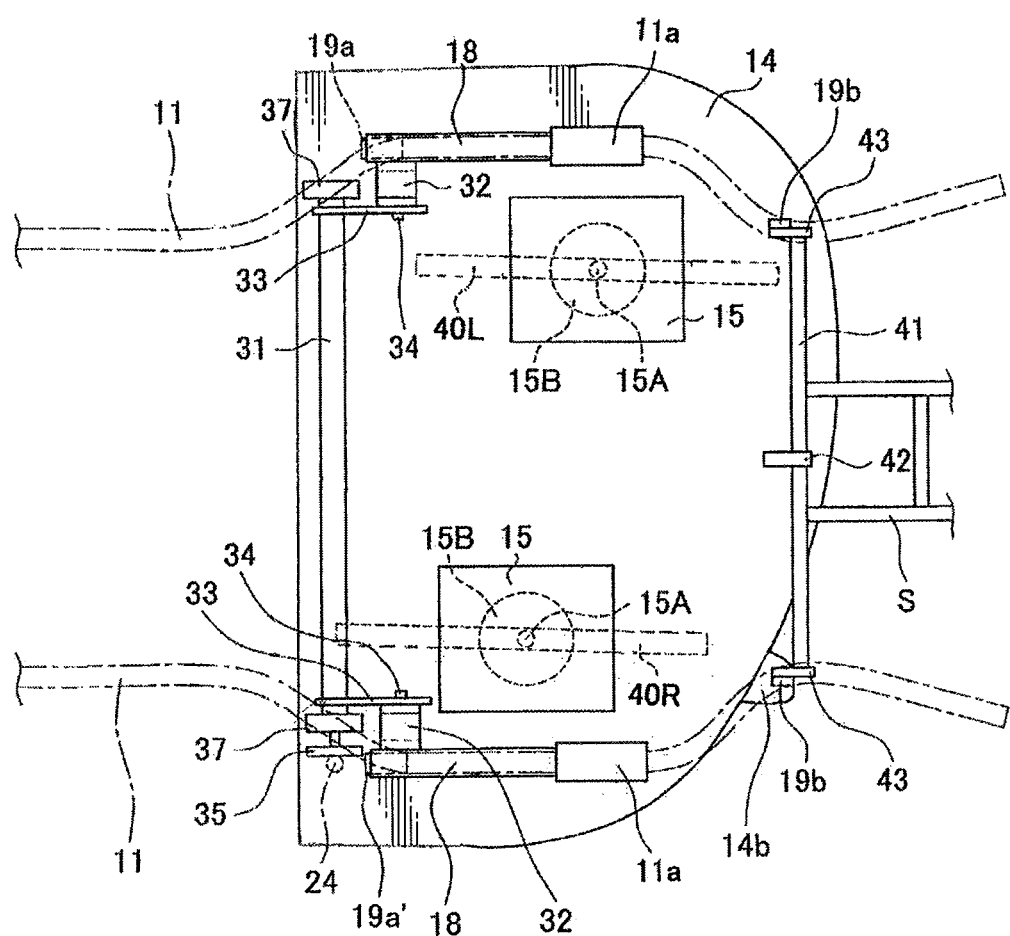
FIG. 4 is an enlarged plan view of a portion near a mower deck.
Figure 5:
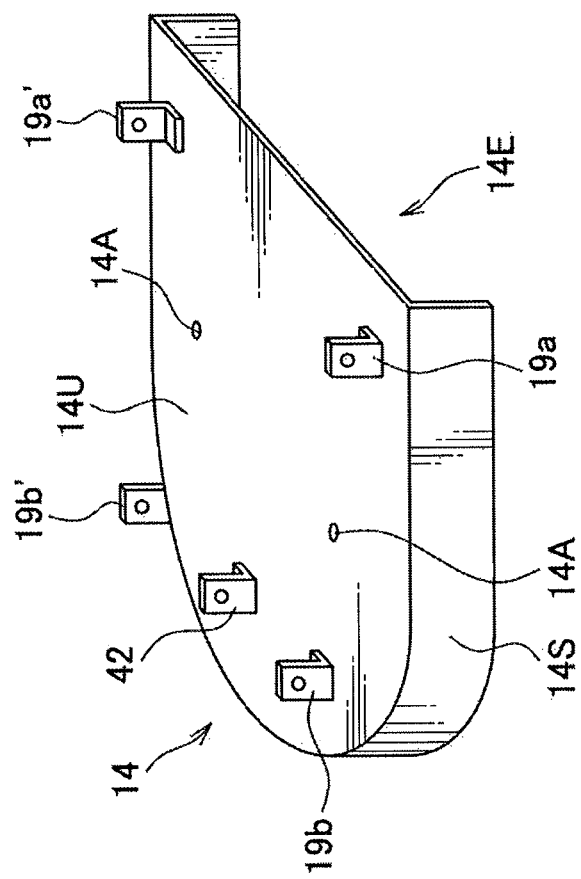
FIG. 5 is a perspective view of the mower deck.

Main parts of this embodiment are illustrated in FIG. 3, FIG. 4, and FIG. 5. The deck support arm 18 is formed in the form of a gate-shaped frame in a cross-sectional view. Through holes are formed on both side surfaces of upper and lower ends of the deck support arm 18. Further, other through holes are formed on both side surfaces of a lower portion of the deck support arm. The through hole formed at the upper end of the deck support arm 18 is aligned with a through hole of a stay 11a fixed to the chassis 11 and a pin 18c is inserted into the through holes, so that the upper end of the deck support arm 18 is rotatably mounted on the chassis 11.

The mower deck 14 includes a top surface 14U and a side surface 14S, and includes an opening 14E at the rear portion thereof. In a plan view, the front portion of the top surface 14U is formed in an arc shape and both side portions and the rear portion thereof are formed in a straight shape. Further, through holes 14A and 14A through which rotating shafts 15A of the mower motors 15 pass are formed at the top surface 14U. Furthermore, stays 19a, 19a', and 19b are mounted on the top surface 14U by welding or the like. The stays 19a, 19a', and 19b are formed by bending rectangular metal plates in a substantially L shape, and through holes are formed at the erected portions of the stays. A protruding portion 14b is formed at the right front portion of the side surface 14S of the mower deck 14, and a stay 19b' is fixed to the protruding portion 14b so as to be erected. A through hole is formed on the side surface of the stay 19b'. Meanwhile, another stay 42 is provided on the top surface 14U. The stay 42 is formed by bending a rectangular metal plate in a substantially L shape, and a through hole is formed at the erected portion of the stay.

The mower deck 14, which is formed as described above, is rotatably mounted by pins 18b so that the through holes of the stays 19a and 19a' are aligned with the through holes formed at the lower ends of the left and right deck support arms 18 and 18. Further, a deck support shaft 41 rotatably passes through the through hole of the stay 42. Connecting members 43 are fixed to both ends of the deck support shaft 41 by welding or the like. Through holes are formed at the connecting members 43. These through holes are aligned with the through holes of the stays 19b and 19b' and pins pass through the through holes, respectively, so that the deck support shaft 41 is rotatably mounted on the mower deck 14. A pair of shafts S is formed at the middle portion of the deck support shaft 41. The shafts S are mounted so as to extend forward, and front end portions of the shafts S are appropriately rotatably mounted on the chassis 11 (not illustrated).

The two mower motors 15 and 15 are placed on and fixed to the top surface 14U of the mower deck 14 by bolts or the like. The rotating shafts 15A of the mower motors 15 protrude to the inside of the mower deck 14 (that is, the back side of the top surface 14U) from the through holes 14A that are formed at the top surface 14U. Further, the mower blades 40L and 40R are fixed to the ends of the respective rotating shafts 15A. Meanwhile, in a plan view, the mower blade 40L rotates clockwise and the mower blade 40R rotates counterclockwise.

One end of a link plate 32 is mounted on the rear end portion of each deck support arm 18 by a pin 18a. The link plate 32 is formed of a Z-shaped angle steel material, and a lift arm 33 is mounted on the other end of the link plate 32 by a pin 34. The lift arm 33 is formed of a metal plate and is formed substantially in the shape of a fan. In the lift arm, a long hole is formed along the arc and a mounting hole is formed at the center. The pin 34 is movably fitted in this long hole. A lift shaft 31 passes through the mounting holes of the lift arms 33, and the lift shaft 31 is fixed to the lift arms 33 by welding.

The lift shaft 31 is formed in the shape of a rod, and both end portions of the lift shaft 31 pass through connecting members 37 and 37. The lift shaft 31 is rotatable relative to the connecting members 37. Meanwhile, stays 36 are fixed to the lower surfaces of the chassis 11. Through holes formed at the stays 36 and through holes formed at the connecting members 37 are aligned with each other and the stays 36 and the connecting members 37 are fixed to each other by bolts.

A lever plate 35 is fixed to the left end of the lift shaft 31 by welding or the like. The lever plate 35 fixes the lift shaft 31 to the lift operation lever 24. The lever plate 35 is formed in the shape of a rectangular plate, and the lower end portion of the lift operation lever 24 is fixed to the middle portion of the lever plate 35 by welding or the like. Accordingly, when the lift operation lever 24 is rotated, the lift shaft 31 is rotated in synchronization with the rotation of the lift operation lever 24.

Meanwhile, the mower deck 14 is suspended under the chassis 11 by the stays 19a and 19a' that are mounted on both sides of the rear portion of the mower deck 14, the stays 19b and 19b' that are mounted on both sides of the front portion of the mower deck, and the stay 42 that is mounted on the middle portion of the front portion of the mower deck. Accordingly, the weight of the mower deck 14 is always distributed to the lift arms 33 through the deck support arms 18. Therefore, the lift arm 33 is positioned at the lowest end of the long hole in a normal state.

Figure 6A:
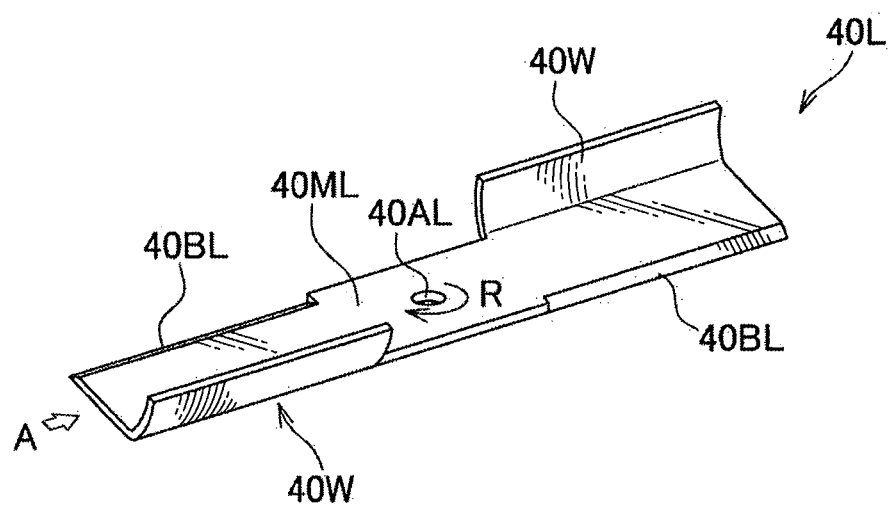
FIG. 6A to FIG. 6C are diagrams illustrating a left mower blade.
Figure 6B:
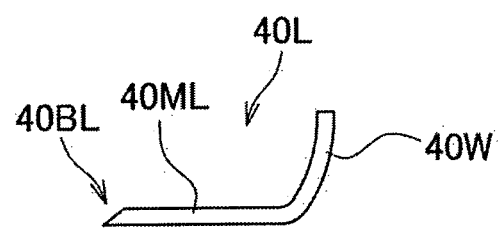
Figure 6C:
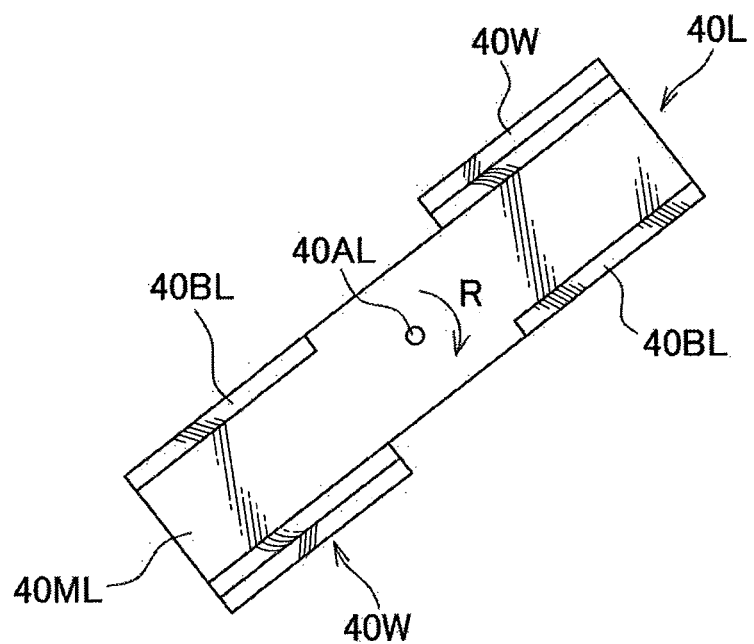

The mower blade 40L is formed of a metal plate having a predetermined thickness, and cutting edges 40BL and wings 40W are formed on both long sides of the mower blade 40L as illustrated in FIG. 6A to FIG. 6C. Further, a through hole 40AL is formed at the center of the mower blade 40L. The cutting edges 40BL and 40BL, which are formed on both the long sides of the mower blade 40L, are symmetrically positioned with respect to the through hole 40AL. The wings 40W and 40W, which are formed on both the long sides of the mower blade 40L, are also symmetrically positioned with respect to the through hole 40AL. The wing 40W is formed so as to be inclined upward relative to a mower blade body 40ML in an arc shape toward the outside of the mower blade body 40ML. In the drawings, reference character R denotes a direction where the mower blade 40L rotates when being mounted on the mower motor 15 and mowing the lawn.

Figure 6D:
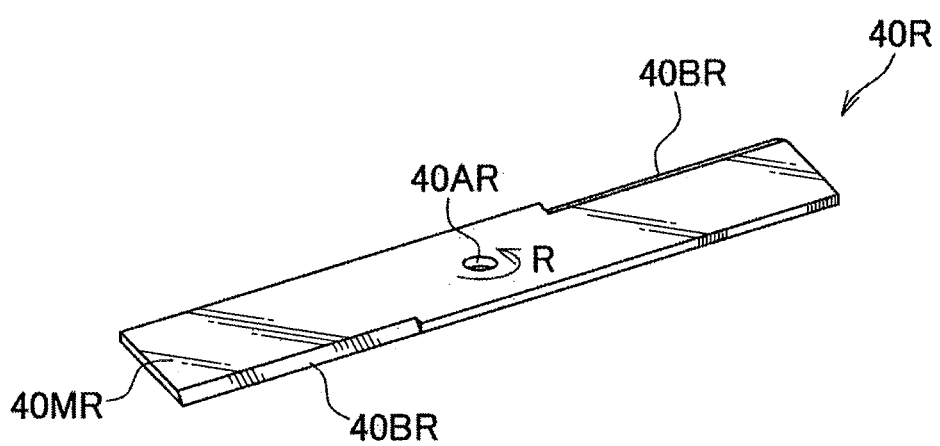
FIG. 6D is a perspective view of a right mower blade.

The mower blade 40R is formed of a metal plate having a predetermined thickness, and cutting edges 40BR are formed on both long sides of the mower blade 40R as illustrated in FIG. 6D. Further, a through hole 40AR is formed at the center of the mower blade 40R. The cutting edges 40BR and 40BR, which are formed on both the long sides of the mower blade 40R, are symmetrically positioned with respect to the through hole 40AR. In the drawing, reference character R denotes a direction where the mower blade 40R rotates when being mounted on the mower motor 15 and mowing the lawn.

Meanwhile, the mower blades 40L and 40R have a function of mowing the lawn by rotating at a high speed, a function of generating an air flow by rotating at a high speed, and a function of discharging the mowed lawn to the outside of the mower deck together with this air flow. In general, since the mower blade has a thickness, the mower blade can generate a certain amount of air flow according to the thickness of the mower blade when rotating at a high speed. If the mower blade 40L is provided with the wings 40W, it is possible to effectively increase the amount of air flow that is generated when the mower blade 40L rotates.

It is preferable that the projected area of the mower blade 40L, when the wings 40W of the mower blade 40L are projected on a vertical plane, be in the range of 100% to 700% compared to the projected area of a mower blade that does not include the wing 40W (that is, the projected area corresponding to the thickness of the mower blade 40R). Accordingly, it is preferable that the shape of the wing 40W be determined in this range.

Figure 7:
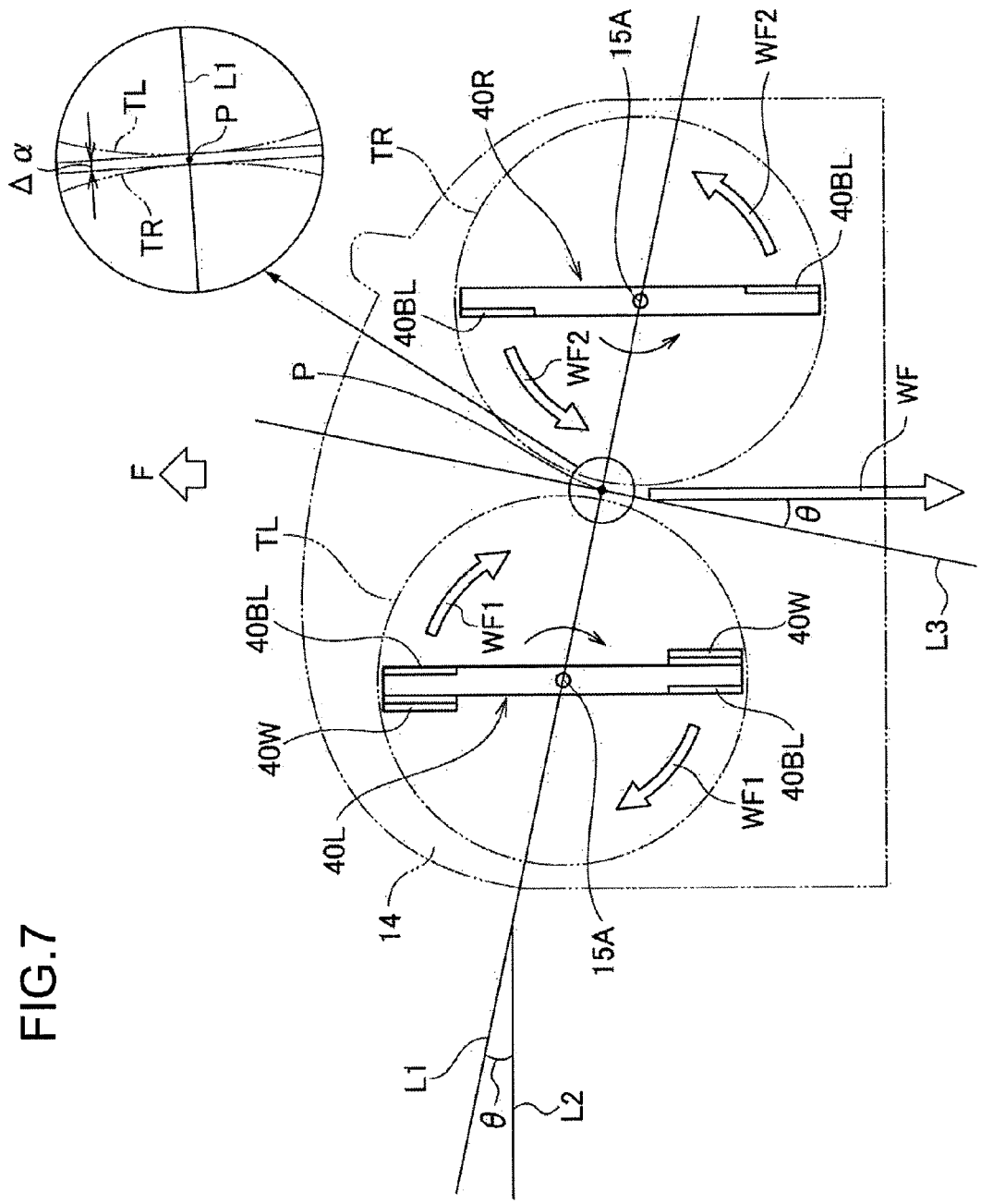
FIG. 7 is a diagram illustrating an air flow in the mower deck.

As illustrated in FIG. 7, in a plan view, the rotation center of the mower blade 40L, which is positioned on the left side in the mower deck 14, is disposed obliquely on the left front side of the rotation center of the mower blade 40R that is positioned on the right side (meanwhile, an arrow F represents the forward direction of the electric lawn mower 10). Specifically, a straight line L3, which is orthogonal to a straight line L1 connecting the centers of the rotating shafts 15A and 15A of the two mower blades 40R and 40L, is disposed so as to be tilted to the right side with respect to the forward direction F of the electric lawn mower 10 by an angle θ in a plan view. Meanwhile, the paths TR and TL of rotation of the mower blades 40R and 40L are closest to each other with a short distance Δα on the straight line L1. Further, the middle point of the distance Δα is referred to as a closest point P. The short distance Δα between the paths TR and TL of rotation of the mower blades 40R and 40L at the closest point P may be appropriately set. There is widely known a technique where two mower blades described above are disposed so as to prevent the mowed lawn from remaining (meanwhile, the rotation center of the mower blade 40R may be disposed obliquely on the right front side of the rotation center of the mower blade 40L). Meanwhile, the mower blade 40L rotates clockwise and the mower blade 40R rotates counterclockwise.

Since the mower blade 40L is provided with the wings 40W in this embodiment, it is possible to make the amount of air flow WF1, which is generated by the clockwise rotation of the mower blade 40L, be larger than the amount of air flow WF2 that is generated by the counterclockwise rotation of the mower blade 40R. These two air flows WF1 and WF2 are combined with each other at the position where the paths TL and TR of rotation of the two mower blades 40L and 40R are closest to each other, that is, at the closest point P. A combined air flow WF is directed to the substantially right behind of the mower deck 14 (the substantially right behind of the electric lawn mower 10), and is discharged from the opening 14E of the mower deck 14. At this time, an angle between the direction of the tangent line L3 of the paths TL and TR of rotation of the two mower blades 40L and 40R at the closest point P and the air flow WF substantially becomes θ (this is substantially equal to an angle between the above-mentioned straight line L1 and a straight line L2 parallel to the width direction of the electric lawn mower 10. In other words, a direction orthogonal to the straight line L1 becomes the direction of the tangent line L3).

A component, which is parallel to a vehicle width direction, (a rightward component parallel to the straight line L2 in FIG. 7) of the momentum of the air flow WF1, which is generated by the mower blade 40L, is larger than a component, which is parallel to the vehicle width direction, (a leftward component parallel to the straight line L2 in FIG. 7) of the momentum of the air flow WF2 that is generated by the mower blade 40R. Accordingly, the combined air flow WF of the air flows WF1 and WF2 is not parallel to the tangent line L3 and is tilted counterclockwise by an angle θ.

Meanwhile, if the mower blade 40L is not provided with the wings 40W, the amount of air flow generated by the left mower blade is substantially the same as the amount of air flow generated by the right mower blade. In this case, a combined air flow is generated in the direction of the tangent line L3 of the two paths of rotation at the closest point P where the paths TL and TR of rotation of the left and right mower blades are closest to each other. For this reason, it is not possible to discharge the mowed lawn to the right behind of the mower deck 14. In other words, in the above-mentioned embodiment, the amount of air flow WF1 generated by the mower blade 40L is increased so that the direction of the combined air flow is tilted from the direction of the tangent line L3 by an angle θ.

The rotational speeds of the mower motors 15 and 15, which rotate the left and right mower blades 40L and 40R, have been equal to each other in this embodiment, but the invention is not limited thereto. The rotational speeds of the left and right mower motors 15 and 15 may be separately set.

Further, the shape of the wing 40W of the mower blade 40L is not limited to this embodiment, and may be any shape as long as the amount of air flow generated by the mower blade 40L is increased.

Furthermore, the left mower blade of the mower deck 14 may be provided with wings and the rotational speed of the left mower blade may be set to be higher than the rotational speed of the right mower blade.

Next, a second embodiment will be described with reference to FIG. 8. This embodiment is different from the previous embodiment in that left and right mower blades 140L and 140R are provided with wings 140WL and 140WR, respectively. Since other structures are the same, the description thereof will not be repeated. If the mower blade 140R is provided with wings, it is possible to increase the amount of air flow WF12 that is generated by the right mower blade 140R. Accordingly, it is possible to increase the amount of combined air flow WF13 of an air flow WF11 that is generated by the mower blade 140L and an air flow WF12 that is generated by the mower blade 140R, and to discharge the mowed lawn further from the opening 14E. Meanwhile, it is necessary to change the rotational speeds of the left and right mower blades 140L and 140R in order to make the combined air flow WF13 be directed to the substantially right behind of the mower deck 14. Specifically, the rotational speed of the left mower blade 140L is set to be higher than the rotational speed of the right mower blade 140R so that the speed of the air flow WF11 generated by the mower blade 140L is higher than the speed of the air flow WF12 generated by the mower blade 140R.

Meanwhile, the rotational speeds of the left and right mower motors 15 and 15 may be set to be equal to each other and the wings 140WL and 140WR of the mower blades 140L and 140R may be formed in different sizes or shapes so that the combined air flow WF13 is directed to the substantially right behind of the mower deck 14.

A third embodiment will be described below. Meanwhile, since the third embodiment is the same as the first embodiment except for the structures of the mower blades 40L and 40R, the description of the third embodiment for the structures of the mower blades will not be provided. Mower blades 40L' and 40R' of this embodiment are formed as illustrated in FIG. 9A and FIG. 9B.

Figure 9A:
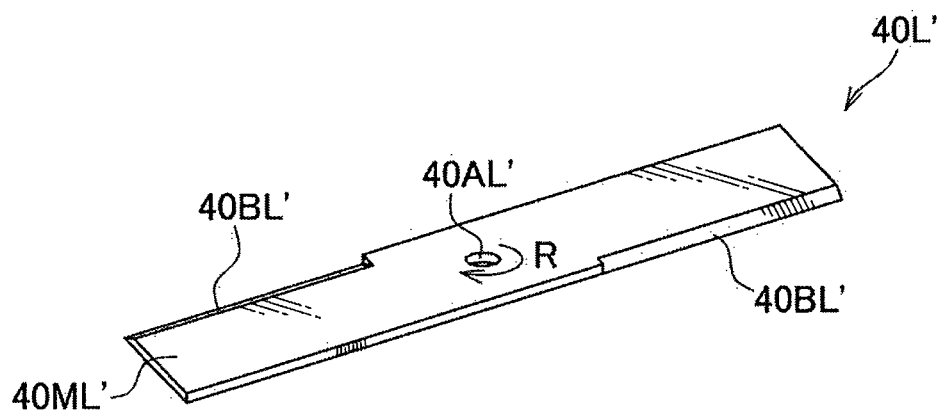
FIG. 9A illustrates a left mower blade.

The mower blade 40L' is formed of a metal plate having a predetermined thickness, and cutting edges 40BL' are formed on both long sides of the mower blade 40L' as illustrated in FIG. 9A. Further, a through hole 40AL' is formed at the center of the mower blade 40L'. The cutting edges 40BL' and 40BL', which are formed on both the long sides of the mower blade 40L', are symmetrically positioned with respect to the through hole 40AL'. In the drawing, reference character R denotes a direction where the mower blade 40L' rotates when being mounted on the mower motor 15 and mowing the lawn.

Figure 9B:
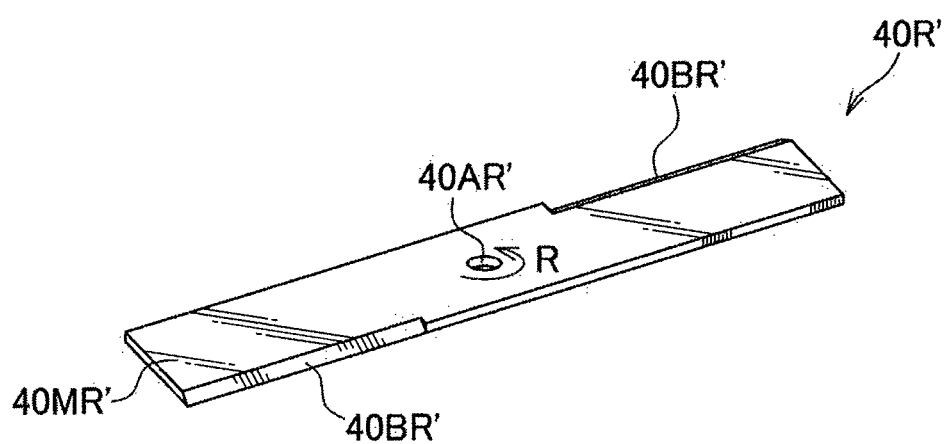
FIG. 9B illustrates a right mower blade.

The mower blade 40R' is formed of a metal plate having a predetermined thickness, and cutting edges 40BR' are formed on both long sides of the mower blade 40R' as illustrated in FIG. 9B. Further, a through hole 40AR' is formed at the center of the mower blade 40R'. The cutting edges 40BR' and 40BR', which are formed on both the long sides of the mower blade 40R', are symmetrically positioned with respect to the through hole 40AR'. In the drawing, reference character R denotes a direction where the mower blade 40R' rotates when being mounted on the mower motor 15 and mowing the lawn. The mower blade 40R' is the same as the mower blade 40L' in terms of a material, dimensions, and the like except for the positions of the cutting edges 40BR'.

Meanwhile, the mower blades 40L' and 40R' have a function of mowing the lawn by rotating at a high speed, a function of generating an air flow by rotating at a high speed, and a function of discharging the mowed lawn to the outside of the mower deck together with this air flow. Since the mower blades 40L' and 40R' have a predetermined thickness, the mower blades 40L' and 40R' can generate a certain amount of air flow according to the thickness of the mower blades 40L' and 40R' when rotating at a high speed.

Figure 10:
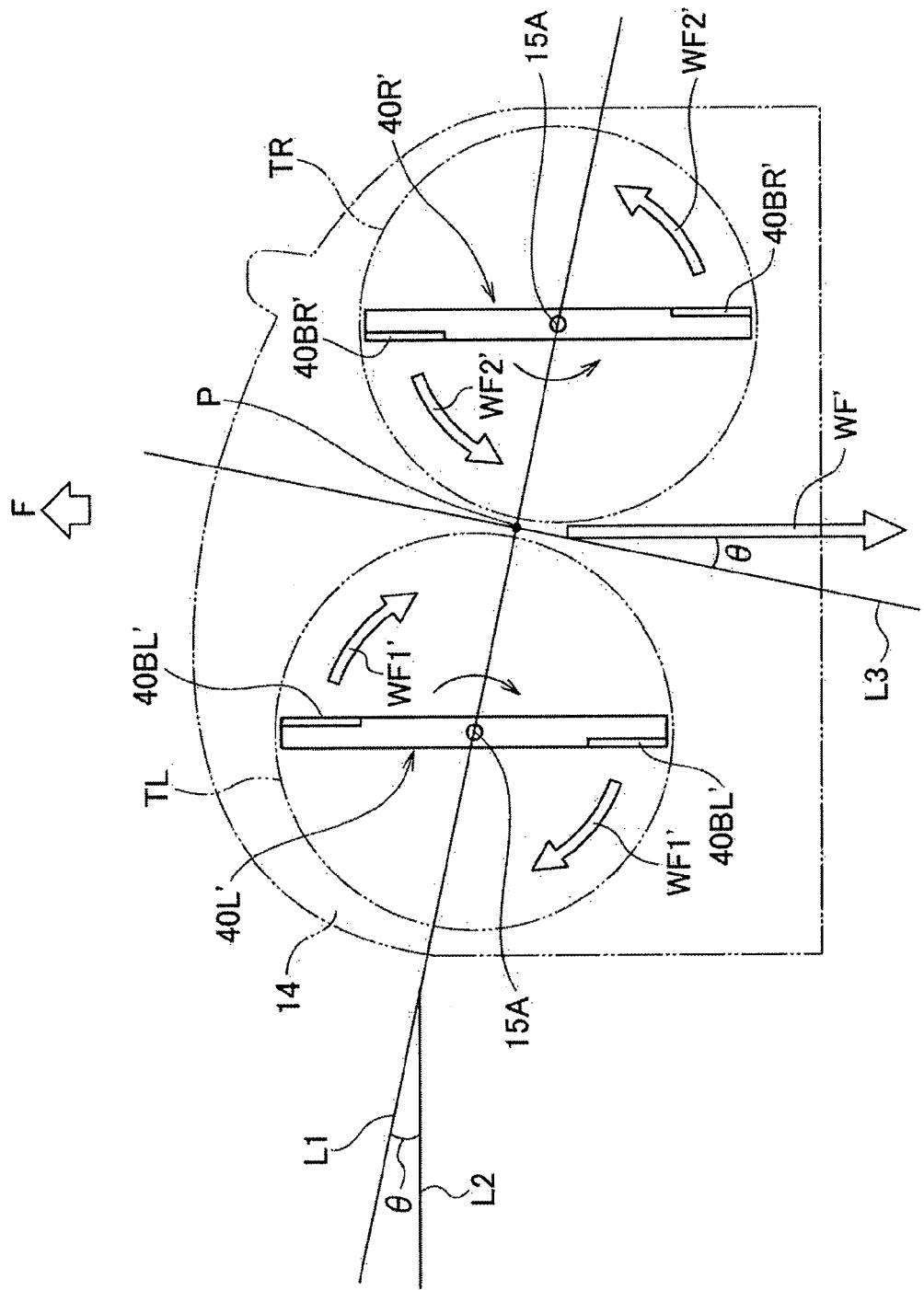
FIG. 10 is a diagram illustrating an air flow in a mower deck of an electric lawn mower of the third embodiment.
Figure 11A:
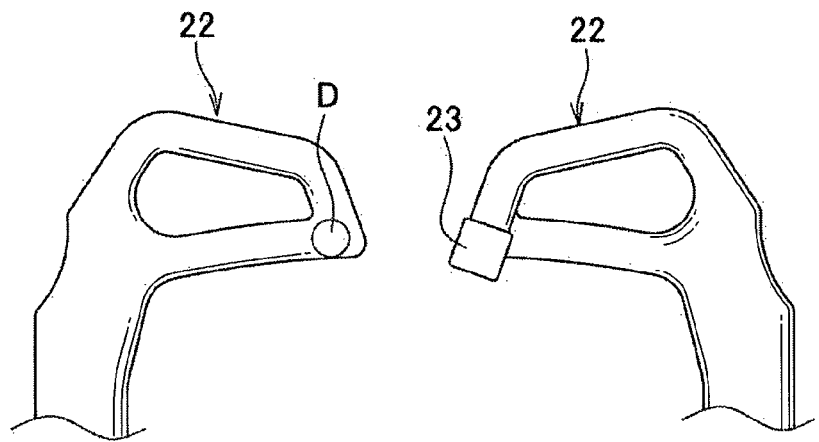
FIG. 11A is an enlarged plan view of a main part of a travel operation lever of an electric lawn mower of a fourth embodiment.
Figure 11B:
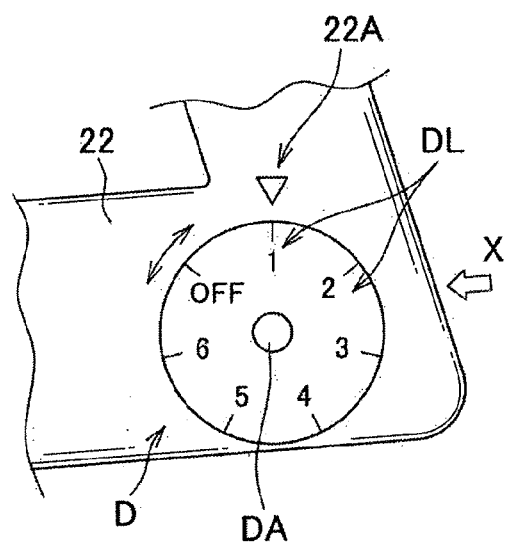
FIG. 11B is a plan view of a portion near a blade setting dial that is mounted on a left travel operation lever of an electric lawn mower of a fourth embodiment.
Figure 11C:
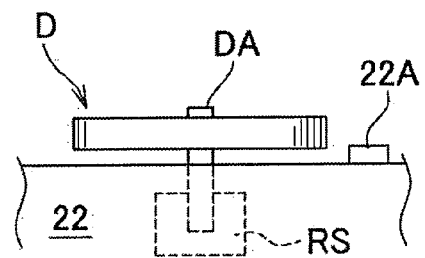
FIG. 11C is a side view seen in the direction of an arrow X of FIG. 11B of an electric lawn mower of a fourth embodiment.

As illustrated in FIG. 10, in a plan view, the rotation center of the mower blade 40L', which is positioned on the left side in the mower deck 14, is disposed obliquely on the left front side of the rotation center of the mower blade 40R' that is positioned on the right side (meanwhile, an arrow F represents the forward direction of the electric lawn mower 10). In other words, a straight line L1, which connects the rotation center of the left mower blade 40L' (the center of the rotating shaft 15A) to the rotation center of the right mower blade 40R' (the center of the rotating shaft 15A), is slightly tilted to the left front side (angle θ) from a straight line L2 that represents the vehicle width direction of the electric lawn mower 10.

In this embodiment, the rotational speed of the mower blade 40L', which rotates clockwise, is set to be higher than the rotational speed of the mower blade 40R' that rotates counterclockwise. This control is performed by the controller that is provided on the batteries 25. It is possible to make the speed of an air flow WF1', which is generated by the rotation of the mower blade 40L', be higher than the speed of an air flow WF2', which is generated by the rotation of the mower blade 40R', by making the rotational speeds of the mower blades 40L' and 40R' be different from each other. These two air flows WF1' and WF2' are combined with each other at the position (closest approach point) P where the paths TL and TR of rotation of the two mower blades 40L' and 40R' are closest to each other. A combined air flow WF' is directed to the substantially right behind of the mower deck 14 (the substantially right behind of the electric lawn mower 10), and is discharged from the opening 14E of the mower deck 14. At this time, an angle between the direction of a tangent line L3 of the two paths TL and TR of rotation at the closest point P and the air flow WF' substantially becomes θ (which is substantially equal to an angle between the above-mentioned straight lines L1 and L2).

A component, which is parallel to the vehicle width direction, (a rightward component parallel to the straight line L2 in FIG. 10) of the velocity vector of the air flow WF1', which is generated by the mower blade 40L', is larger than a component, which is parallel to the vehicle width direction, (a leftward component parallel to the straight line L2 in FIG. 10) of the velocity vector of the air flow WF2' that is generated by the mower blade 40R'. Accordingly, the combined air flow WF' of the air flows WF1' and WF2' is not parallel to the tangent line L3 and is tilted counterclockwise by an angle θ.

Meanwhile, if the rotational speeds of the left and right mower motors 15 are set to be equal to each other, the amount of air flow generated by the mower blade 40L' is substantially the same as the amount of air flow generated by the mower blade 40R'. In this case, a combined air flow is generated in the direction of the tangent line L3 of the two paths TL and TR of rotation at the closest point P. For this reason, it is not possible to discharge the mowed lawn to the right behind of the mower deck 14. In other words, in this embodiment, the speed of the air flow generated by the mower blade 40L' is increased so that the direction of the combined air flow is tilted from the direction of the tangent line L3 by an angle θ. Meanwhile, it is more preferable that the rotational speed of the left mower blade 40L' be increased by 5 to 50% as compared to the rotational speed of the right mower blade 40R'.

The invention is not limited to generating a combined air flow so as to discharge the mowed lawn to the right behind of the mower deck, and an object of the invention is to generate a combined air flow so as to discharge mowed lawn in a desired direction (which may be any direction as long as mowed lawn is discharged to the rear of the mower deck 14). Accordingly, it is possible to appropriately form wings or to appropriately set the rotational speeds of the mower blades in order to generate a combined air flow so that the combined air flow is directed in a desired direction. For example, the left mower blade may be disposed obliquely in front of the right mower blade and the rotational speed of the left mower motor may be set to be lower than that of the right mower motor. In this case, it is possible to discharge mowed lawn to the left rear side of the mower deck.

Moreover, as for the generation of a combined air flow, a method of making the amount of air flow, which is generated by the left mower blade, be different from the amount of air flow that is generated by the right mower blade and a method of making the speed of the air flow, which is generated by the left mower blade, be different from the speed of the air flow that is generated by the right mower blade have been separately described in the above-mentioned two embodiments. However, the invention is not limited thereto. That is, a combined air flow may be generated from the combination of the difference in the amount of air flow generated by the left and right mower blades and the difference in the speed of the air flow generated by the left and right mower blades. In this case, for example, if the amount of air flow generated by the left mower blade is excessively larger than the amount of air flow generated by the right mower blade when only the left mower blade is provided with wings, the direction of a combined air flow may be appropriately adjusted by making the rotational speed of the left mower blade be lower than the rotational speed of the right mower blade.

Next, a fourth embodiment will be described. The mower blades 40L' and 40R' described with reference to FIG. 9A and FIG. 9B are used in this embodiment. Further, this embodiment is adapted so that the rotational speeds of the left and right mower blades 40L' and 40R' can be periodically changed. That is, as illustrated in FIG. 11A to FIG. 11C and FIG. 12A, a blade setting dial (adjusting unit) D is provided at the end portion of the left travel operation lever 22. The blade setting dial D is used to set the periods of the rotational speeds of the mower blades 40L' and 40R' when periodically changing the rotational speeds of the mower blades 40L' and 40R', respectively. The blade setting dial D is formed in a disc shape, and a front end of a rotating shaft DA is fixed to the central portion of the blade setting dial D. A rear end of the rotating shaft DA is rotatably mounted in the left travel operation lever 22 while being connected to a rotation sensor RS.

Since characters of "OFF" and "1" to "6" are written on the surface of the blade setting dial D, it is possible to set the change periods of the rotational speeds of the mower blades 40L' and 40R' by making an arrow portion 22A, which is fixed to the travel operation lever 22 and is used for positioning, correspond to one of the characters. When "OFF" of the blade setting dial D corresponds to the arrow portion 22A, the rotational speeds of the mower blades 40L' and 40R' are set so as not to be changed. When "1" of the blade setting dial D corresponds to the arrow portion 22A, the change periods of the rotational speeds of the mower blades 40L' and 40R' are set so as to be short. Numbers "2", "3", ... "6" of the blade setting dial D are appropriately made to correspond to the arrow portion 22A in order to set the change periods of the rotational speeds of the mower blades 40L' and 40R' to a long period (accordingly, when "6" corresponds to the arrow portion 22A, the change periods of the mower blades 40L' and 40R' can be set to the longest period).

The rotation sensor RS is connected to a controller CT through harness that is wired in the travel operation lever 22 and the cowl 20. The rotation sensor RS detects the rotational position of the blade setting dial D and sends the detected rotational position to the controller CT. The controller CT is disposed on the batteries 25 in the cowl 20. A signal sent from the controller CT is sent to a motor driver (not illustrated), so that the motor driver rotates the left and right mower motors 15 and 15. The mower blades 40L' and 40R' are fixed to the rotating shafts of the left and right mower motors 15 and 15, respectively.

Figure 12A:
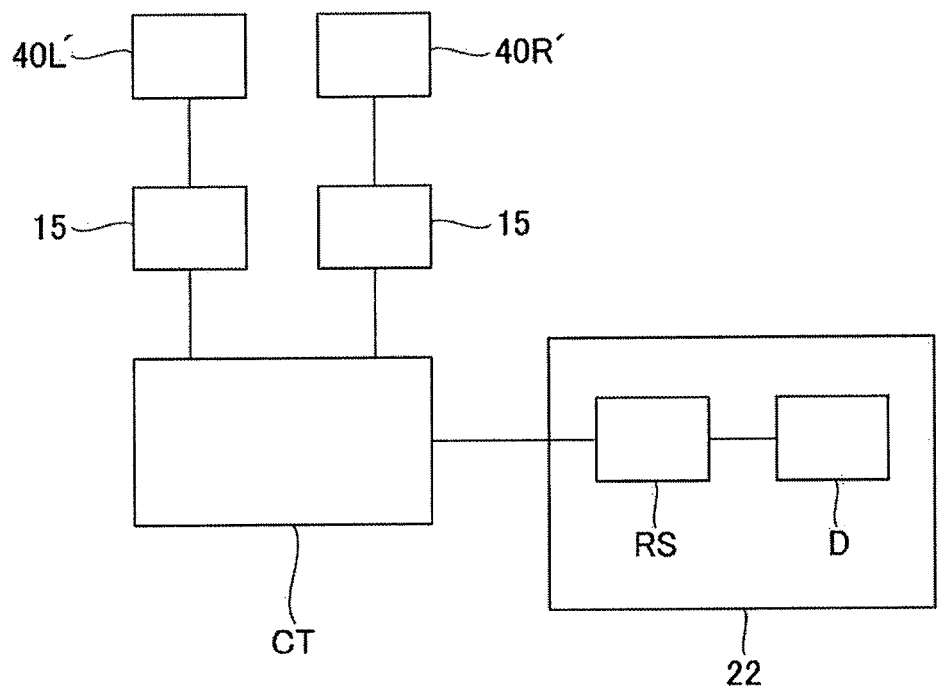
FIG. 12A is a block diagram illustrating a relation between a controller, a travel operation lever, and left and right mower blades.
Figure 12B:
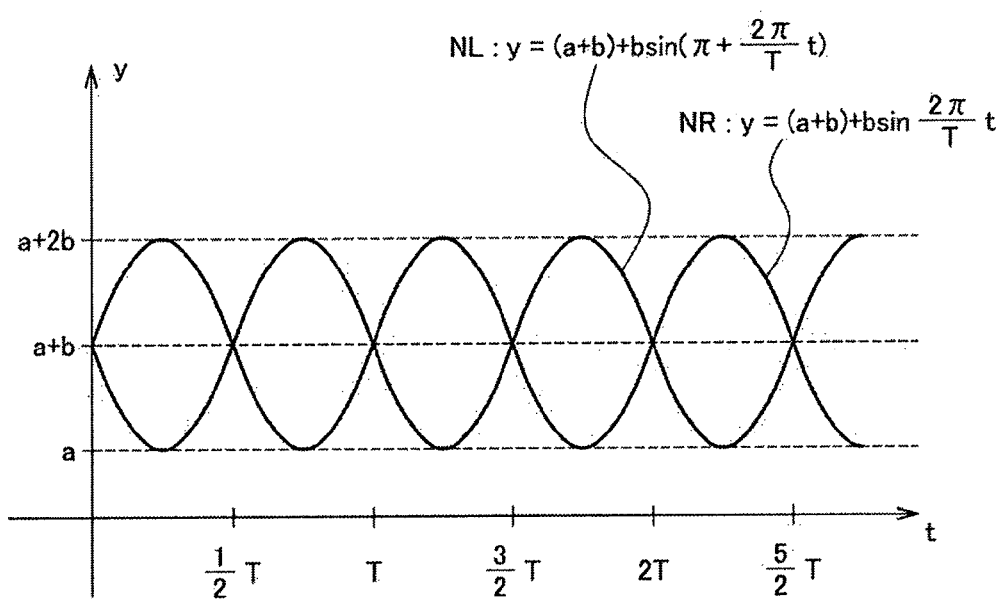
FIG. 12B is a diagram illustrating the periodic change of the rotational speeds of the left and right mower blades.

The controller CT controls the change periods and variation of the rotational speeds of the mower motors 15 and 15 based on the signal sent from the rotation sensor RS. As illustrated in FIG. 12B, the variation of the rotational speed of the right mower motor 15 is represented by a sine wave ($\sin(2\pi/T)$), the period is denoted by T, and the amplitude is denoted by b (b is a constant). Invariable rotational speed ((a+b) rpm, a is a constant) is added to the variation of the rotational speed, so that the rotational speed NR of the right mower motor 15 is changed as y (=(a+b)+b $\sin(2\pi/T)$ rpm). That is, the right mower motor 15 corresponds to the sum of the rotational speed ((a+b) rpm), which is the reference, and a variation (y=b $\sin(2\pi/T)$ rpm).

Meanwhile, the variation of the rotational speed of the left mower motor 15 is represented by a sine wave ($\sin[(2\pi/T)+\pi]$), the period is denoted by T, and the amplitude is denoted by b. Invariable rotational speed ((a+b) rpm) is added to the variation of the rotational speed, so that the rotational speed NL of the left mower motor 15 is changed as y (=(a+b)+b $\sin[(2\pi/T)+\pi]$ rpm). That is, the left mower motor 15 corresponds to the sum of the rotational speed ((a+b) rpm), which is the reference, and a variation (y=b $\sin[(2\pi/T)+\pi]$ rpm). As described above, the change period of the rotational speed of the left mower motor 15 is advanced relative to that of the rotational speed of the right mower motor 15 by a half period. For this reason, it is possible to further increase a difference between the rotational speeds of the left and right mower motors 15 and 15.

When the blade setting dial D is sequentially changed from "1" to "6", the periods T of the left and right mower motors 15 are sequentially shortened (reduced). Further, when the blade setting dial D corresponds to "OFF", the left and right mower motors 15 rotate at the invariable rotational speed ((a+b) rpm).

Figure 13:
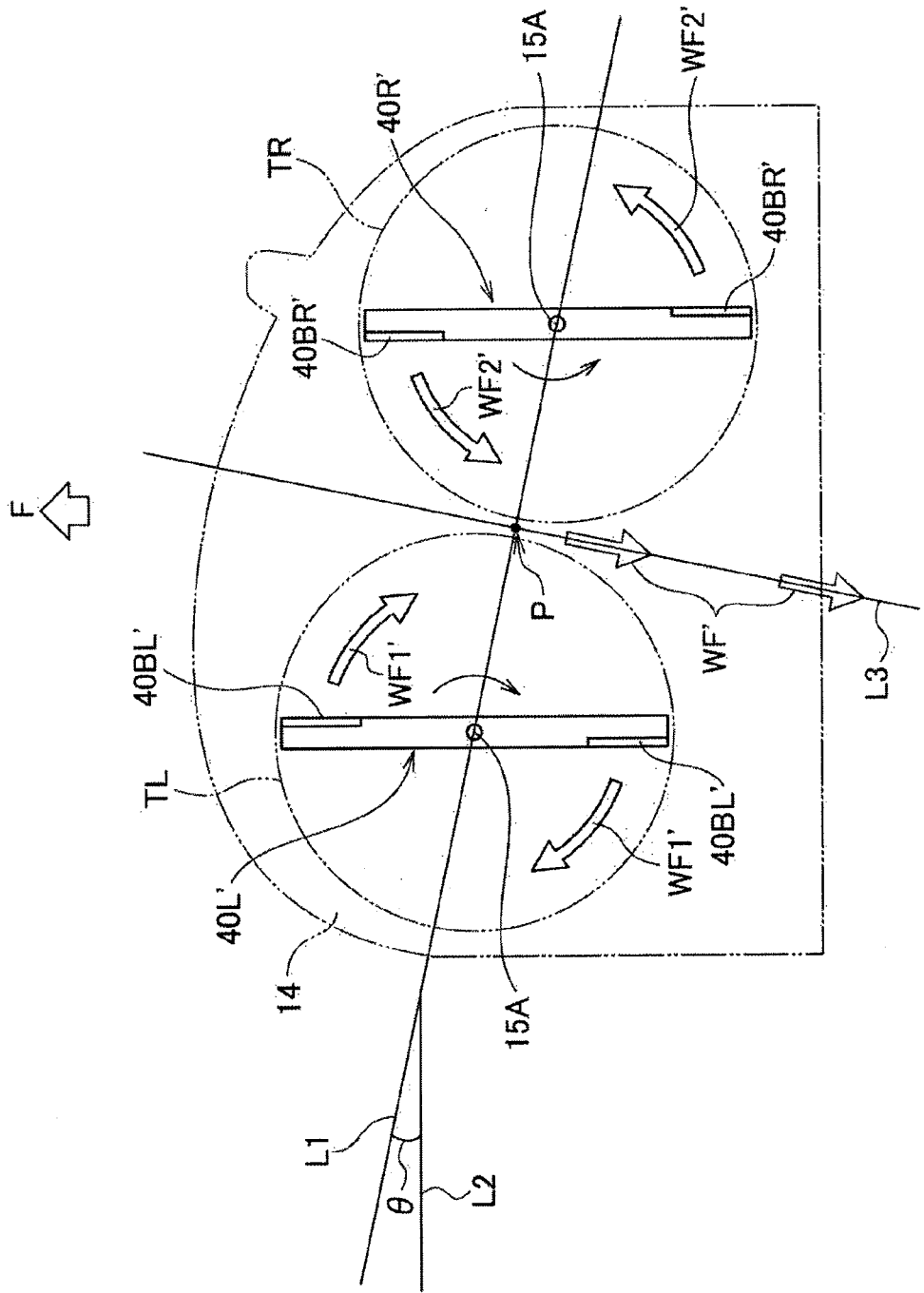
FIG. 13 is a diagram illustrating a general air flow in the mower deck.

As illustrated in FIG. 13, in a plan view, the rotation center of the mower blade 40L', which is positioned on the left side in the mower deck 14, is disposed obliquely on the left front side of the rotation center of the mower blade 40R' that is positioned on the right side (meanwhile, an arrow F represents the forward direction of the electric lawn mower 10). Specifically, a straight line L3, which is orthogonal to a straight line L1 connecting the rotating shafts 15A and 15A of the two mower blades 40R' and 40L' (a straight line L1 connecting the rotation center of the left mower blade 40L' to the rotation center of the right mower blade 40R'), is disposed so as to be tilted to the right side with respect to the forward direction F of the electric lawn mower 10 by an angle θ in a plan view (In other words, the straight line L1 is tilted to the left front side with respect to a straight line L2, which represents the vehicle width direction of the electric lawn mower 10, by an angle θ in a plan view). Meanwhile, the paths TR and TL of rotation of the mower blades 40R' and 40L' are closest to each other with a short distance Δα on the straight line L1. Further, the middle point of the distance Δα is referred to as a closest point P. The short distance Δα between the paths TR and TL of rotation of the mower blades 40R' and 40L' at the closest point P may be appropriately set. Accordingly, the air flows WF1' and WF2', which are generated by the respective mower blades 40L' and 40R', are combined with each other at a point where the paths TR and TL of rotation of the mower blades 40R' and 40L' are closest to each other (at the closest point P) on the straight line L1, so that a combined air flow WF' is generated.

When the rotational speed NL of the mower blade 40L' (that is, the rotational speed of the left mower motor 15) and the rotational speed NR of the mower blade 40R' (that is, the rotational speed of the right mower motor 15) correspond to each other (that is, when "t=½T, T, 3/2T, 2T, 5/2T, ... " is Satisfied in FIG. 12B), the Rotational Speeds of the mower blades 40L and 40R satisfy "NL=NR=(a+b) rpm" and the combined air flow WF' is discharged in the direction of the straight line L3. The straight line L3 is orthogonal to the straight line L1 at the closest point P. Accordingly, mowed lawn is discharged from the mower deck 14 in the direction of the straight line L3 together with the combined air flow WF'.

Figure 14:
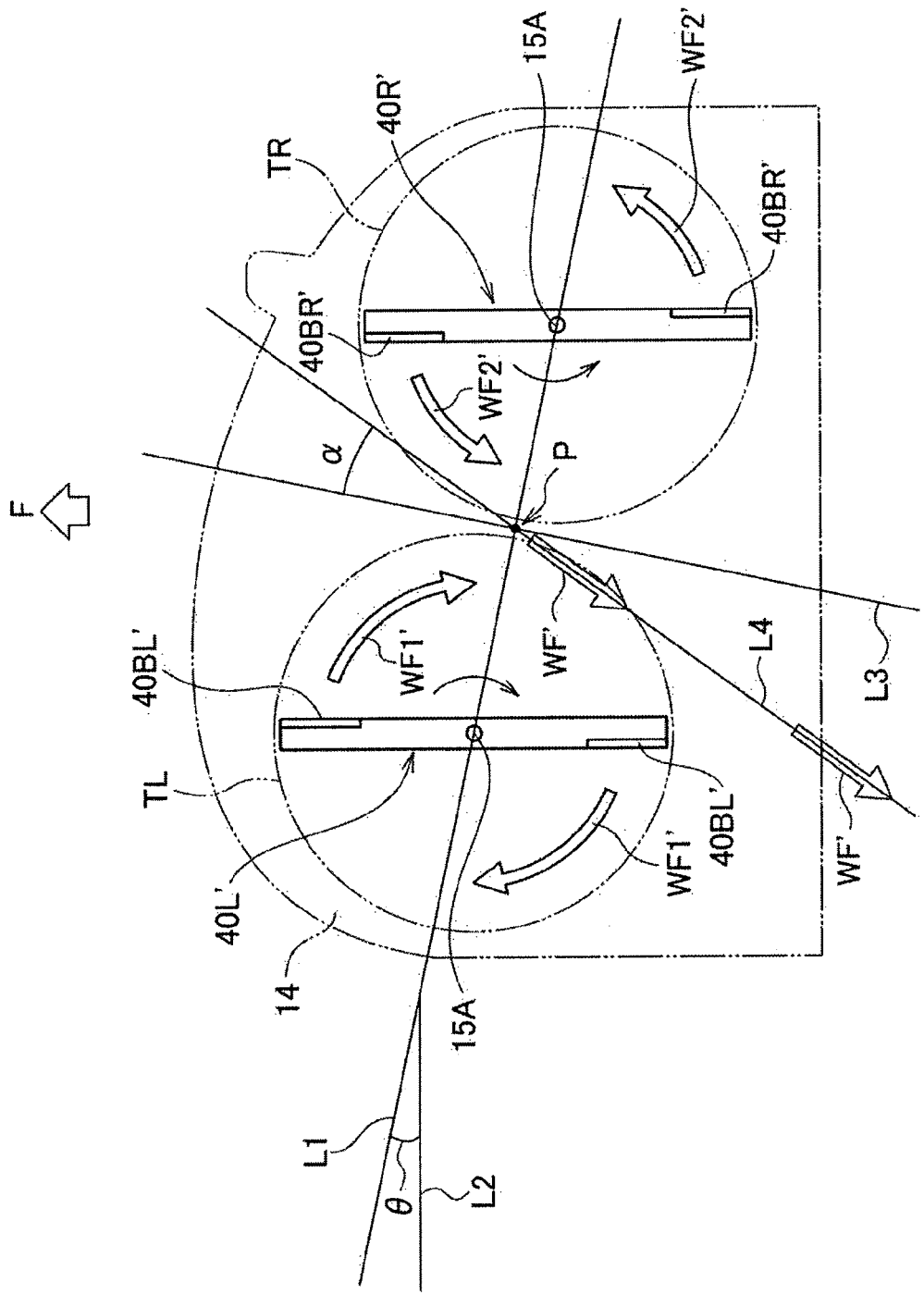
FIG. 14 is a diagram illustrating an air flow to be discharged and an air flow in the mower deck when the rotational speed of the left mower blade is higher than the rotational speed of the right mower blade.

Meanwhile, the rotational speed NL of the mower blade 40L' is higher than the rotational speed NR of the mower blade 40R' (that is, when "½T<t<T, 3/2T<t<2T, ... " are satisfied in FIG. 12B), the combined air flow WF' is generated in the direction of a straight line L4 (the direction of the straight line L4 is changed according to time t) that is rotated clockwise relative to the straight line L3 by an angle α as illustrated in FIG. 14. Accordingly, mowed lawn is discharged from the mower deck 14 in the direction of the straight line L4 together with the combined air flow WF'.

Figure 15:
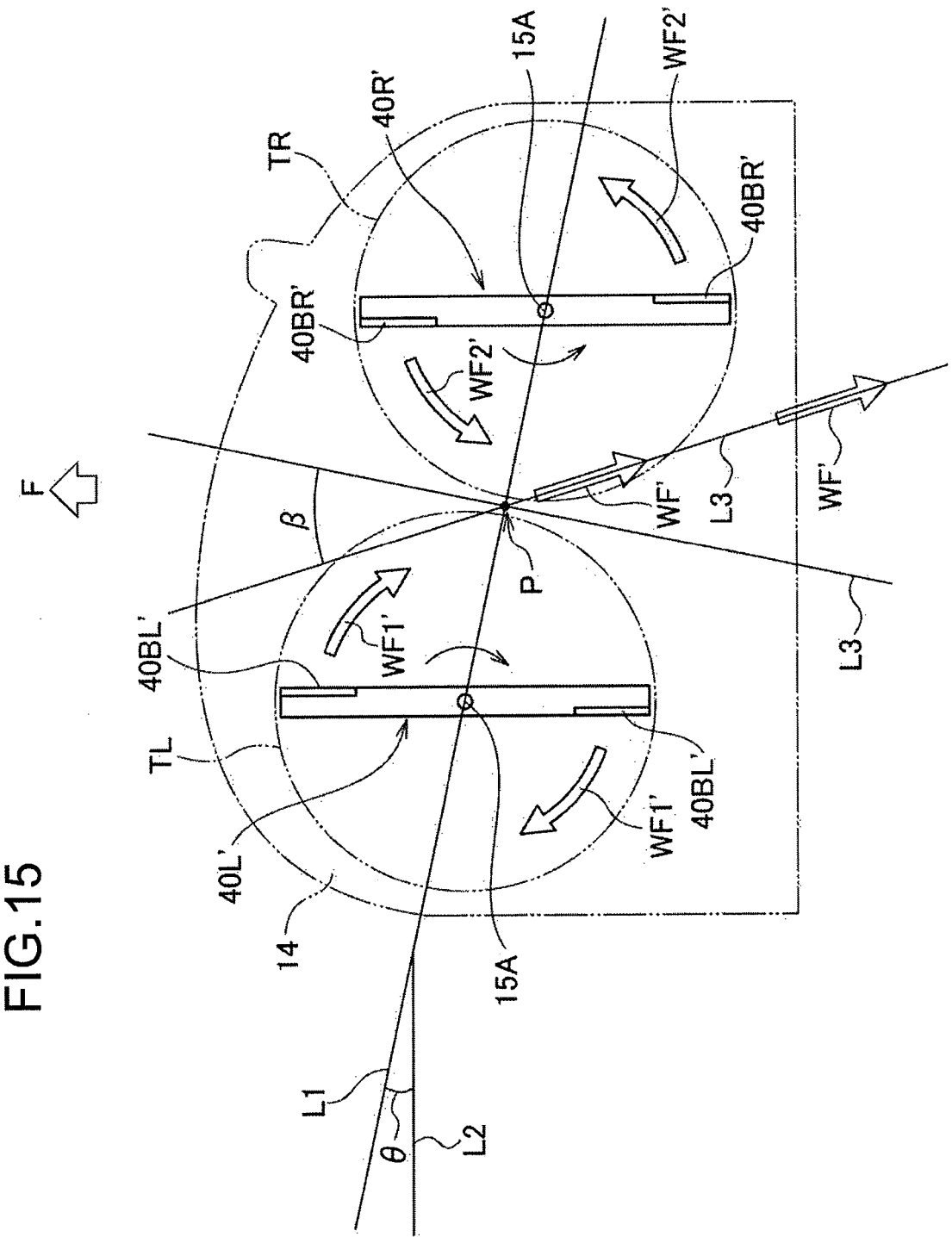
FIG. 15 is a diagram illustrating an air flow to be discharged and an air flow in the mower deck when the rotational speed of the right mower blade is higher than the rotational speed of the left mower blade.

Further, when the rotational speed NR of the mower blade 40R' is higher than the rotational speed NL of the mower blade 40L' (that is, when "0<t<½T, T<t<3/2T, 2T<t<5/2T, ... " are satisfied in FIG. 12B), the combined air flow WF' is generated in the direction of a straight line L4 (the direction of the straight line L4 is changed according to time t) that is rotated counterclockwise relative to the straight line L3 by an angle β as illustrated in FIG. 15. Accordingly, mowed lawn is discharged from the mower deck 14 in the direction of the straight line L4 together with the combined air flow WF'.

In this way, in this embodiment, it is possible to discharge the lawn, which is mowed by the mower blades 40L' and 40R', to the rear of the mower deck 14 so that the lawn is uniform in the vehicle width direction of the electric lawn mower 10.

If the change periods of the rotational speed NL of the left mower motor 15 and the rotational speed NR of the right mower motor 15 are shifted to each other by ½T as in this embodiment, the rotational speed NR of the right mower motor 15 is lower than (a+b) when the rotational speed NL of the left mower motor 15 is higher than (a+b), and the rotational speed NR of the right mower motor 15 is higher than (a+b) when the rotational speed NL of the left mower motor 15 is lower than (a+b). Accordingly, it is possible to further increase a difference between the rotational speeds of the left and right mower motors 15 and to more efficiently discharge the combined air flow WF' to both sides in the vehicle width direction of the electric lawn mower 10.

Figure 16:
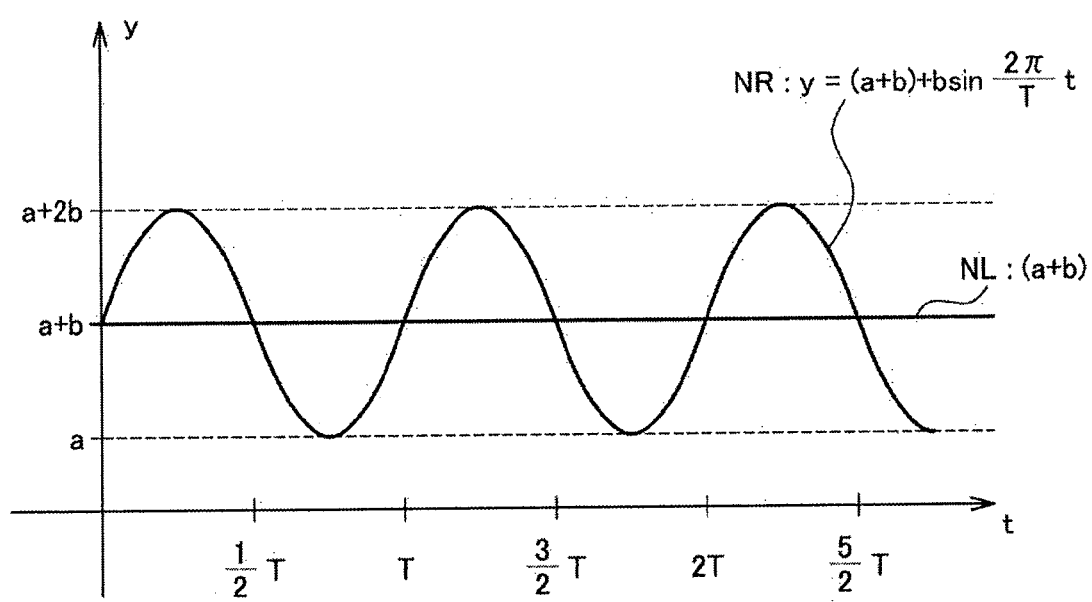
FIG. 16 is a diagram illustrating the periodic change of a difference between the rotational speeds of left and right mower blades of a modification of the fourth embodiment.
Figure 17A:
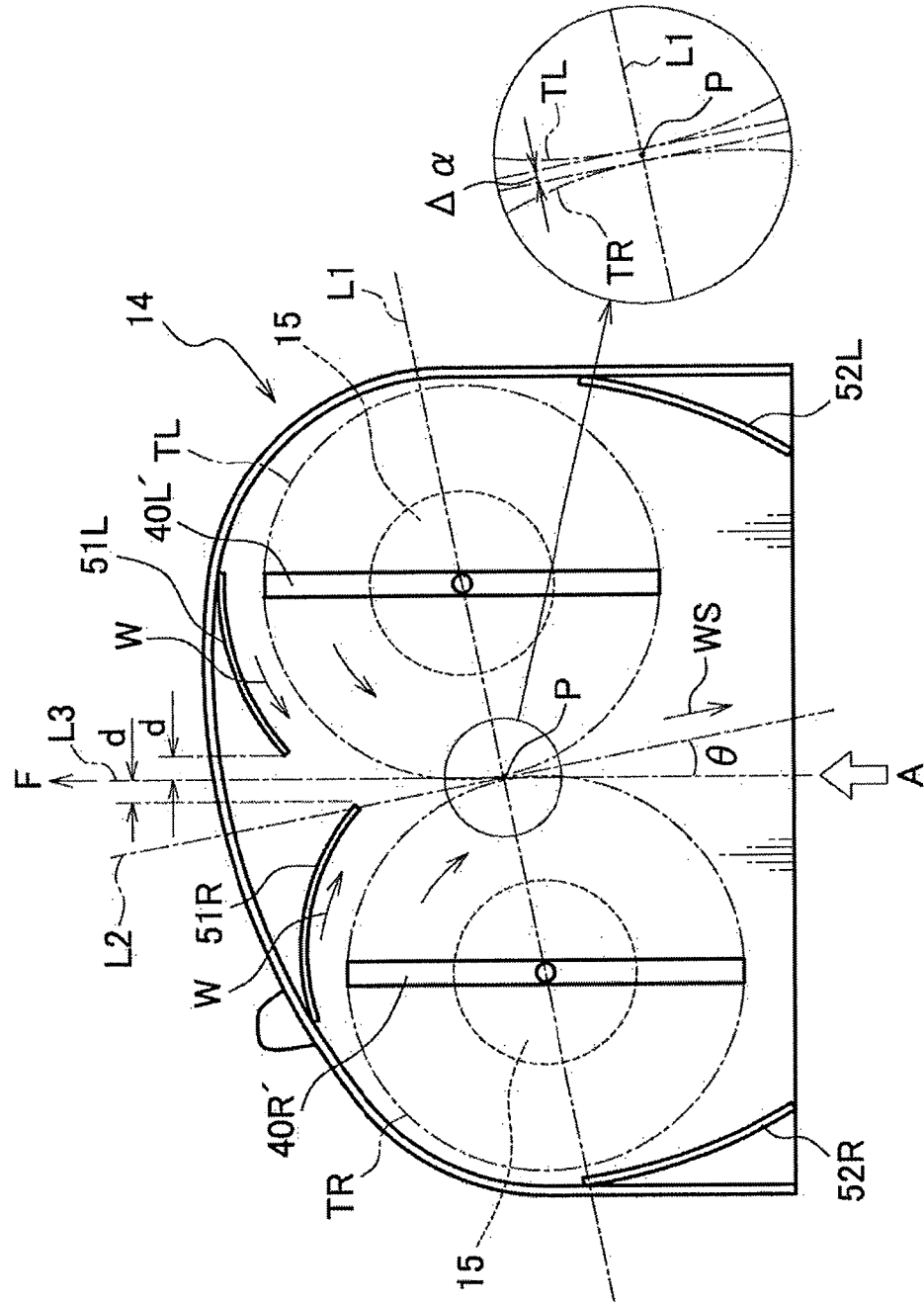
FIG. 17A is a bottom view of the mower deck.
Figure 17B:
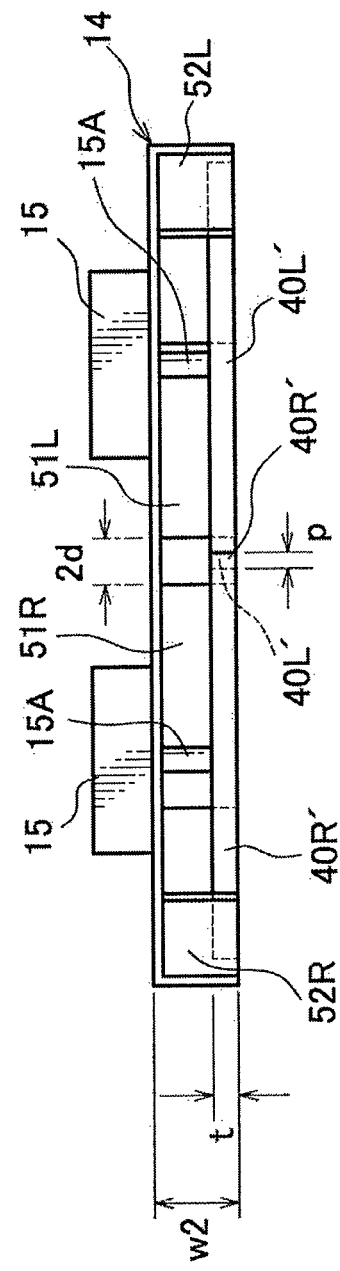
FIG. 17B is a back view seen in the direction of an arrow A of FIG. 17A, and FIG. 17C and FIG. 17D are perspective views of guide plates, respectively.
Figure 17C:
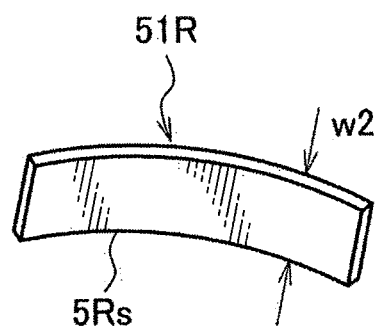
FIG. 17 is a diagram illustrating the structure of another example of the mower deck.
Figure 17D:
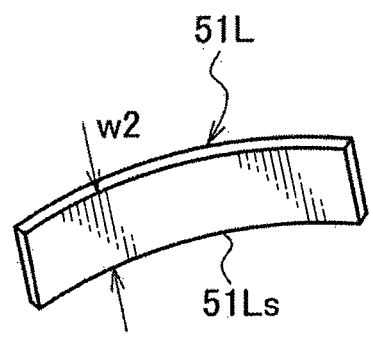

Meanwhile, any one of the left and right mower motors 15 and 15 corresponds to the sum of the invariable rotational speed and the rotational speed caused by the change period in this embodiment, but the invention is not limited thereto. For example, as illustrated in FIG. 16, the rotational speed NL of the left mower motor 15 may be represented by the invariable rotational speed ((a+b) rpm) as a constant and the rotational speed NR of the right mower motor 15 may be changed as y (=(a+b)+b sin(2π/T)] rpm). Meanwhile, in this case, the invariable rotational speed ((a+b) rpm) may not depend on the constants "a" and "b" and another constant c may be used as the rotational speed of the left mower motor 15.

In this case, when the blade setting dial D is sequentially changed from "1" to "6", the period T of the right mower motor 15 is sequentially shortened (reduced). Further, when the blade setting dial D corresponds to "OFF", the right mower motor 15 rotates at the invariable rotational speed ((a+b) rpm) like the left mower motor 15.

Further, the rotational speed NR of the right mower motor 15 may be represented by the invariable rotational speed ((a+b) rpm) as a constant and the rotational speed NL of the left mower motor 15 may be changed as y (=(a+b)+b sin(2π/T) rpm). Meanwhile, in this case, the invariable rotational speed ((a+b) rpm) may not depend on the constants "a" and "b" and another constant c may be used as the rotational speed of the right mower motor 15.

In this case, when the blade setting dial D is sequentially changed from "1" to "6", the period T of the left mower motor 15 is sequentially shortened (reduced). Further, when the blade setting dial D corresponds to "OFF", the left mower motor 15 rotates at the invariable rotational speed ((a+b) rpm) like the right mower motor 15.

Furthermore, the rotational speeds of the left and right mower motors 15 and 15 may be set to be constant and the rotational speeds of the respective mower motors 15 and 15 may be separately set to rotational speeds so that mowed lawn is discharged from the mower deck 14 in a constant direction. In this case, the travel operation lever 22 is provided with a discharge direction setting dial for setting a discharge direction and a rotation sensor, a value detected by the rotation sensor is determined by a controller, and mowed lawn is discharged in a desired direction when the controller determines the rotational speeds of the left and right mower motors 15 and 15 (that is, when the controller determines that the rotational speed of the left and right mower motors 15 are constant without changing and the rotational speeds of the respective mower motors 15 are different from each other).

A mower deck having the structure illustrated in FIG. 17A to FIG. 17D may be applied to the above-mentioned first to fourth embodiments. Here, the structure and operation of this example are the same as those of the third embodiment except that the internal structure of a mower deck 14 is different. As illustrated in a bottom view of the mower deck 14 of FIG. 17A, left and right mower blades 40L' and 40R' are provided adjacent to each other and the mower blade (one mower blade) 40L' is disposed slightly obliquely in front of the mower blade (the other mower blade) 40R' (the mower blade 40R' may be disposed slightly obliquely in front of the mower blade 40L'). Specifically, a straight line L2, which is orthogonal to a straight line L1 connecting the rotating shafts 15A and 15A of the two mower blades 40R' and 40L', is disposed so as to be tilted to the left side with respect to the forward direction F of the electric lawn mower 10 by an angle θ in a bottom view. Meanwhile, the paths TR and TL of rotation of the mower blades 40R' and 40L' are closest to each other with a short distance Δα on the straight line L1. Further, the middle point of the distance Δα is referred to as a closest point P. The short distance Δα between the paths TR and TL of rotation of the mower blades 40R' and 40L' at the closest point P may be appropriately set. Furthermore, the paths TL and TR of rotation of the mower blades 40L' and 40R' are disposed so as to overlap each other by a predetermined distance p (normally, about 5 mm) in a back view.

A pair of guide plates 51R and 51L are provided on the back of the mower deck 14 outside the paths TR and TL of rotation of the mower blades 40R' and 40L' forward in the forward direction F of the electric lawn mower 10. The guide plates 51R and 51L are formed by curving metal plates having a width W2, and side surfaces 51Rs and 51Ls are fixed to the back of the top surface 14U of the mower deck 14 by welding or the like. The guide plates 51R and 51L are provided so that the front end of each of the guide plates 51R and 51L is separated from a straight line L3 passing through the closest point P by a distance d (this straight line L3 is parallel to the forward direction F of the electric lawn mower 10). Accordingly, the guide plates 51R and 51L are provided so as to be separated from each other with a distance 2d interposed therebetween in a front view (and a back view) (the distance 2d between the guide plates 51R and 51L is set to be longer than the short distance Δα between the paths TR and TL of rotation of the mower blades 40R' and 40L'). Meanwhile, the rear ends of the guide plates 51R and 51L are disposed adjacent to the back of the front portion of the side surface 14S of the mower deck 14. It is possible to reduce the resistance of the rear ends of the guide plates 51L and 51R against air flows W generated in the mower deck 14 by disposing the rear ends of the guide plates 51R and 51L in this way. Accordingly, it is possible to make the air flows W smooth.

Further, the guide plates 51R and 51L are provided outside the paths TR and TL of rotation of the mower blades 40R' and 40L' with a constant distance interposed between themselves and the paths TR and TL, respectively. That is, the guide plate 51R is formed in an arc shape so that a distance between the guide plate 51R and the path TR of rotation of the mower blade 40R' is constant over the entire length of the guide plate 51R. Likewise, the guide plate 51L is formed in an arc shape so that a distance between the guide plate 51L and the path TL of rotation of the mower blade 40L' is constant over the entire length of the guide plate 51L. The guide plates 51R and 51L are to guide the air flows W, which are generated in the mower deck 14 by the rotation of the mower blades 40R' and 40L', in a desired direction. In this embodiment, the guide plates 51R and 51L are provided so as to assist the air flows W to be generated substantially toward the rear of the mower deck 14. Incidentally, the mower blade 40R' rotates clockwise and the mower blade 40L' rotates counterclockwise in a bottom view. Meanwhile, the guide plates 51R and 51L are not limited to guide plates that are formed in an arc shape so that the distances between the guide plates and the paths TR and TL of rotation of the mower blades 40R' and 40L' are constant over the entire lengths of the guide plates.

The height of the inner side surface of the mower deck 14 is denoted by W2, and is equal to the widths W2 of the guide plates 51L and 51R. In addition, the thicknesses of the mower blades 40R' and 40L' are denoted by t, and the heights of the lower ends of the mower blades 40R' and 40L', the height of the lower end of the mower deck 14, and the heights of the lower ends of the guide plates 51L and 51R from the ground are substantially equal to each other. Meanwhile, reference numerals 52R and 52L denote rear guide plates that are disposed at the rear portion of the mower deck 14. The widths of the rear guide plates 52R and 52L are equal to the widths W2 of the guide plates 51L and 51R, and the side surfaces of the guide plates 52R and 52L are fixed to the back of the top surface 14U of the mower deck 14 by welding or the like. It is possible to more accurately guide a combined air flow WS, which is generated in the mower deck 14, by providing the rear guide plates 52R and 52L. Meanwhile, the combined air flow WS is an air flow that is obtained from the combination of the air flow W generated by the mower blade 40L' and the air flow W generated by the mower blade 40R' at the closest point P and is directed to the rear of the mower deck 14.

The width W2 of the mower deck 14 and the widths W2 of the guide plates 51L and 51R are not limited to the same width, but the widths W2 of the guide plates 51L and 51R are set to be equal to or larger than the thicknesses t of the mower blades 40R' and 40L'. Meanwhile, in FIG. 17A, the straight line L1 is a line that connects the rotating shafts 15A and 15A of the mower blades 40L' and 40R', the straight line L2 is a line orthogonal to the straight line L1, and the straight line L3 is a line that represents the forward direction F of the electric lawn mower 10.

Figure 18:
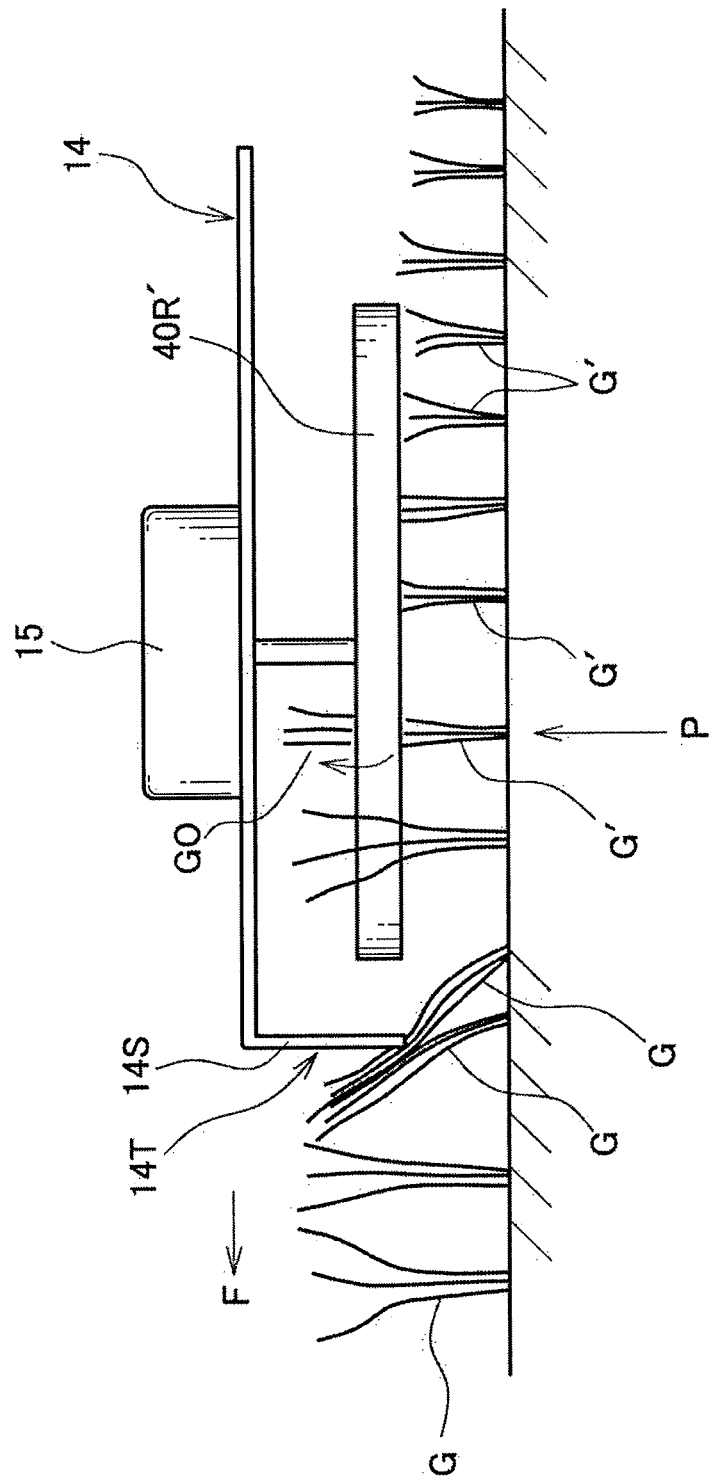
FIG. 18 is a diagram illustrating that the lawn is mowed by the mower deck, and is a diagram when the cross-section of the mower deck formed at a straight line L3 of FIG. 17A is seen from the right side.

FIG. 18 illustrates that lawn (grass) G is mowed by the mower deck 14 having this structure. FIG. 18 illustrates the longitudinal section of the mower deck 14 taken along the straight line L3 of FIG. 17A. When the electric lawn mower 10 travels in the forward direction F and the upper portion of lawn G, which is not yet mowed, comes into contact with the side surface 14S of a front end portion 14T of the mower deck 14, the upper portion of the lawn G is bent forward. Further, when the mower deck 14 moves forward by a predetermined distance, the upper portion of the lawn G is separated from the side surface 14S and returns to an erect posture. The reason for this is that the lawn G does not come into contact with both the guide plates 51L and 51R since a gap 2d is formed between the guide plates 51L and 51R.

Further, the mower deck 14 further moves forward while the lawn G is erected, and the upper portion of the grass G is cut by the rotating mower blade 40R' when the lawn G starts to approach the closest point P. The cut lawn (grass) G0 is carried upward by an air flow that is generated by the rotation of the mower blade 40R', and is discharged rearward from the opening 14E of the mower deck 14 by the air flow W (the lawn (grass), which is shortened by being mowed, is denoted by reference numeral G'). In this way, when the mower deck 14 of this embodiment is used, it is possible to make the lawn G be erected at the closest point P. Accordingly, it is possible to appropriately cut the lawn G.

Figure 19A:
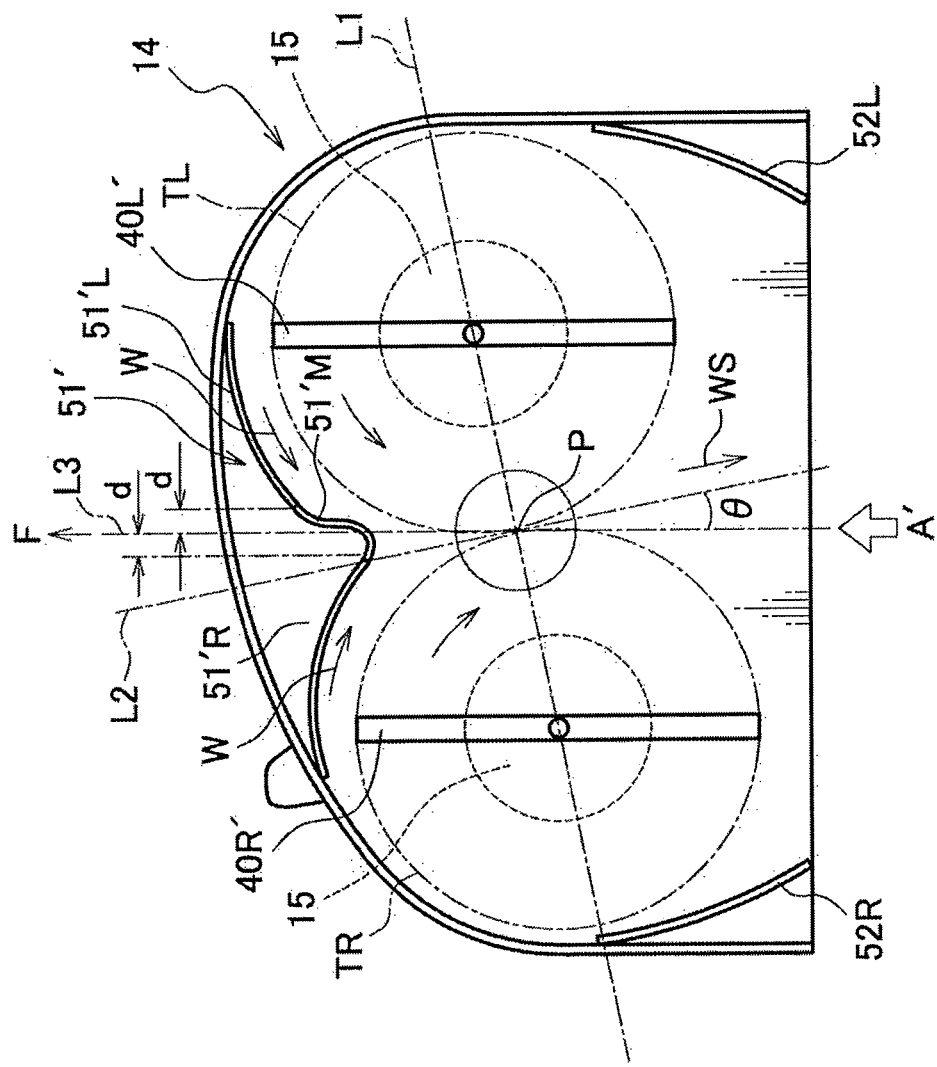
FIG. 19A is a bottom view of the mower deck.
Figure 19B:
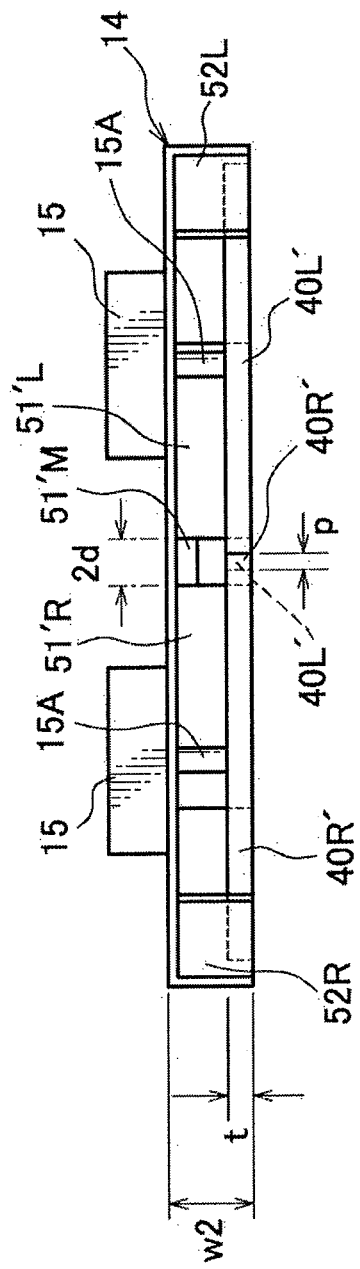
FIG. 19B is a back view seen in the direction of an arrow A' of FIG. 19A.
Figure 19C:
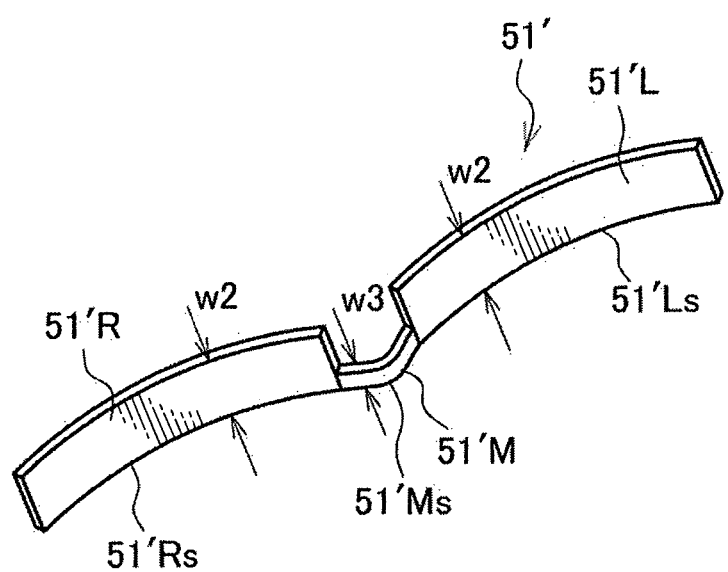
FIG. 19C is a perspective view of a guide plate.
Figure 21:
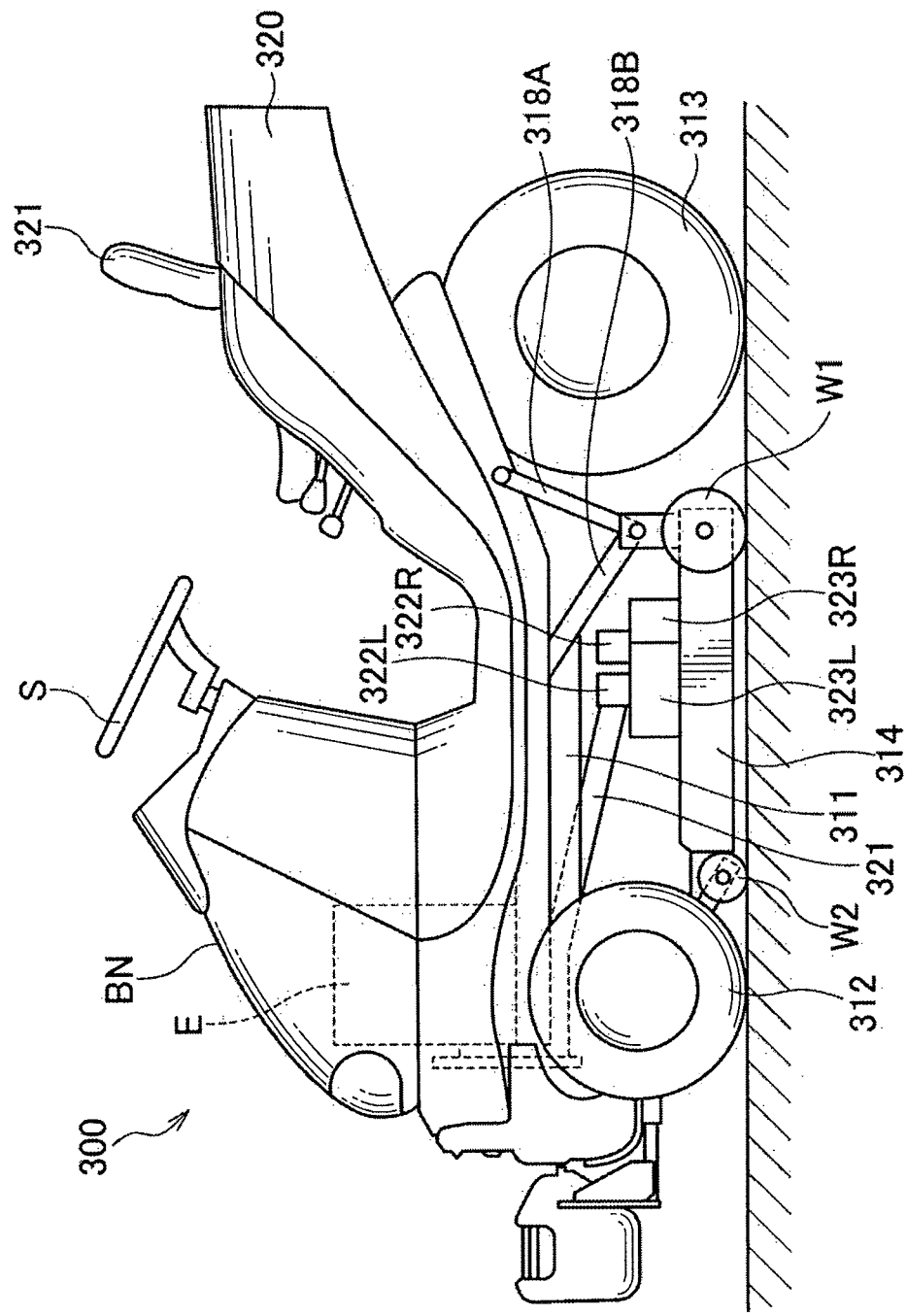
FIG. 21 is a left side view of an engine-driven lawn mower as a fifth embodiment.
Figure 22:
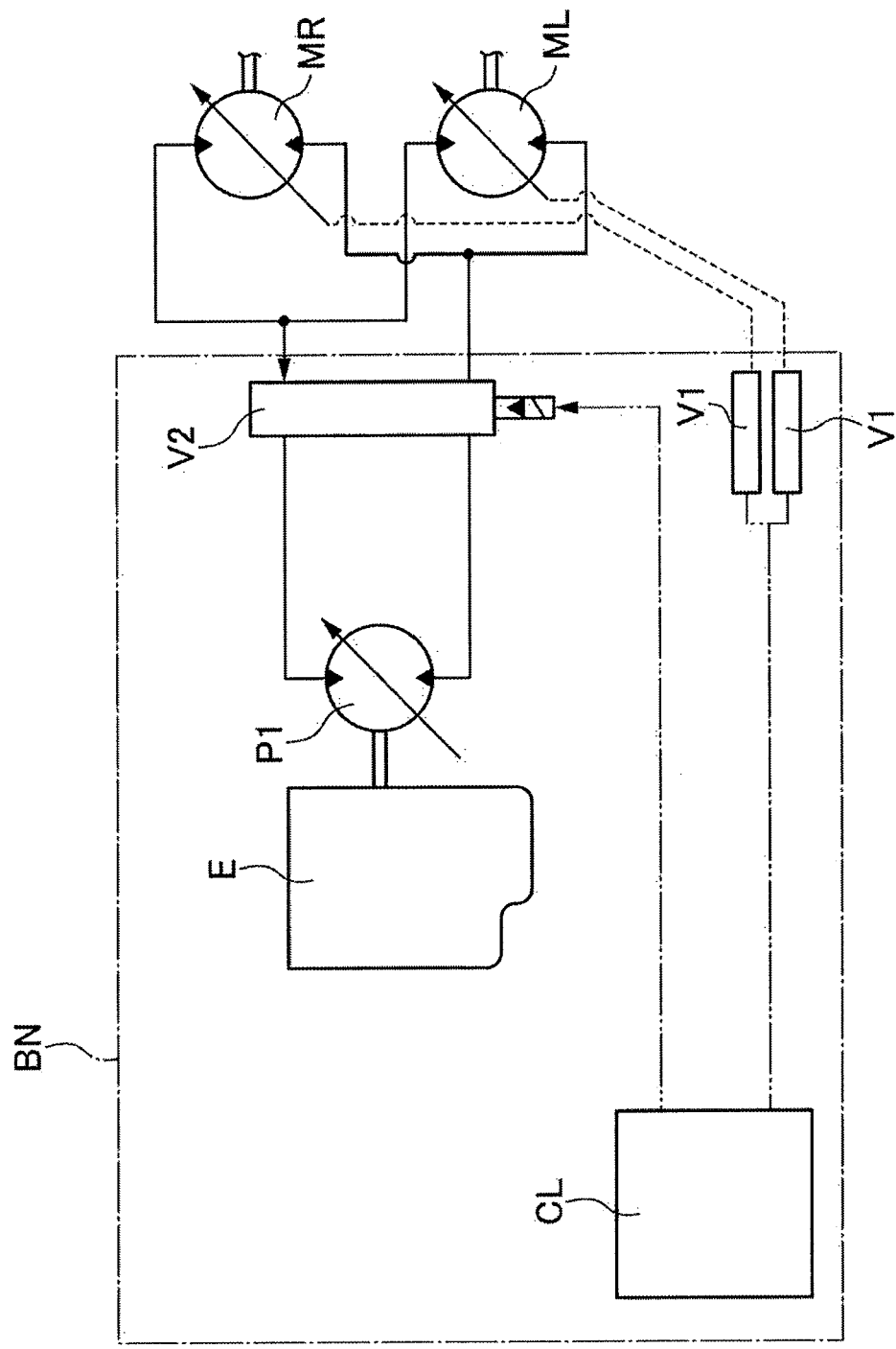
FIG. 22 is a hydraulic circuit diagram of a main part of the lawn mower of FIG. 21.
Figure 23:
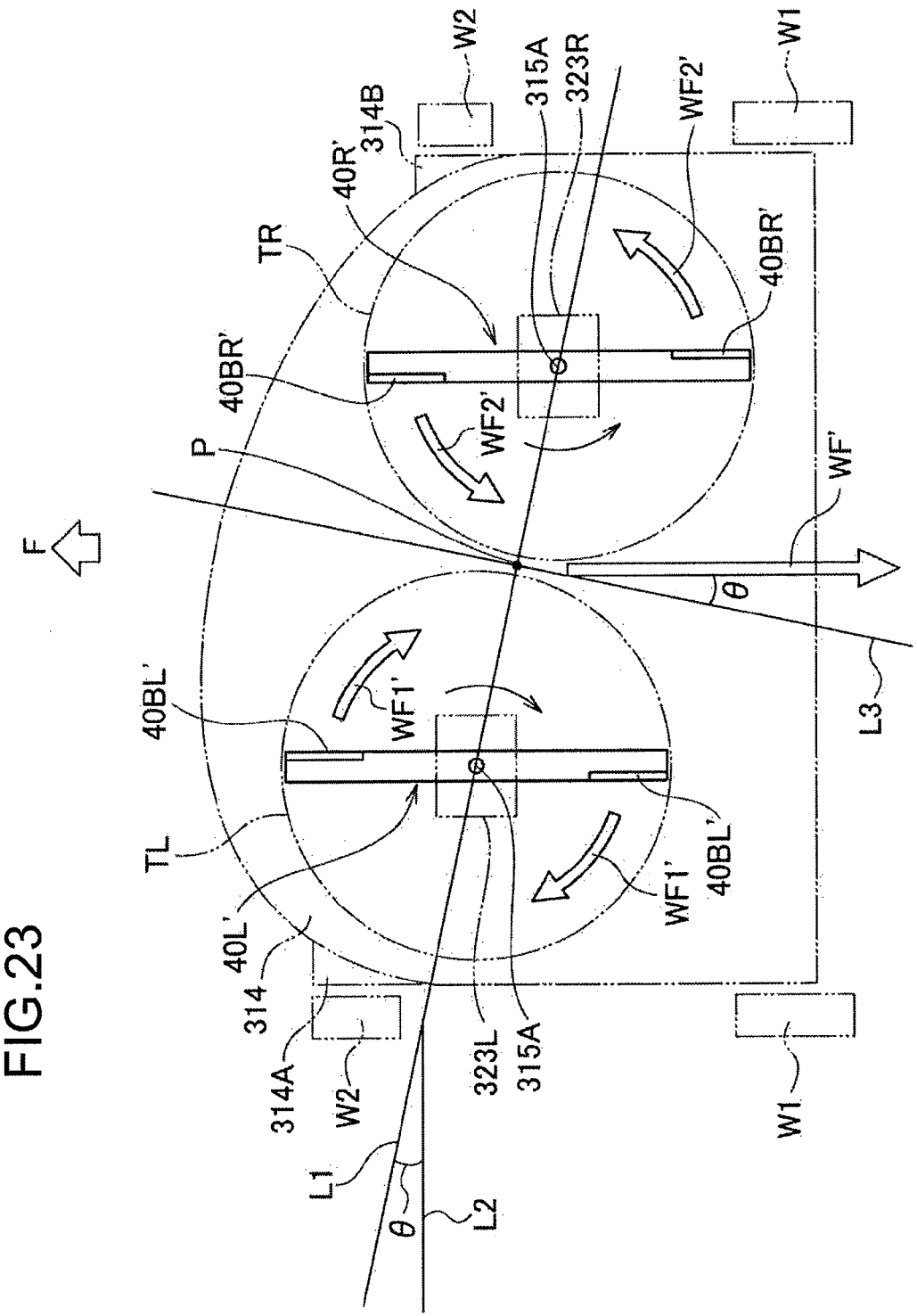
FIG. 23 is a diagram illustrating an air flow in a mower deck of the lawn mower of the fifth embodiment.

FIG. 19A to FIG. 19C illustrate main parts of the modification of FIG. 17. The shape of a guide part 51' of this embodiment is different from that of FIG. 17. Since other structures and operations are the same as those of FIG. 17, the description thereof will not be repeated. The guide part 51' of this embodiment includes a guide plate 51'L, a connecting portion 51'M, and a guide plate 51'R that are integrally formed. The shape and dimensions of the guide plate 51'L and the disposition of the guide plate 51'L in the mower deck 14 are the same as those of the guide plate 51L of the previous embodiment. Likewise, the shape and dimensions of the guide plate 51'R and the disposition of the guide plate 51'R in the mower deck 14 are the same as those of the guide plate 51R of the previous embodiment (the guide plates 51'L and 51'R are referred to as a pair of guide plates). The connecting portion 51'M connects the guide plate 51'L to the guide plate 51'R. The connecting portion 51'M is formed by bending a metal plate, which has a width W3 (W3<W2), in a curved shape. It is preferable that the width W3 of the connecting portion 51'M be smaller than the widths W2 of the guide plates 51'R and 51'L. Meanwhile, a portion which is formed immediately above the connecting portion 51'M and at which an end portion of the guide plate 51'L and an end portion of the guide plate 51'R are divided from each other is referred to as a notch. Further, a combined air flow WS is an air flow that is obtained from the combination of an air flow W generated by the mower blade 40L' and an air flow W generated by the mower blade 40R' at near the closest point P and is directed to the rear of the mower deck 14. Meanwhile, in FIG. 19A, a straight line L1 is a line that connects the rotating shafts 15A and 15A of the mower blades 40L' and 40R', a straight line L2 is a line orthogonal to the straight line L1, and a straight line L3 is a line that represents the forward direction F of the electric lawn mower 10.

FIG. 20 illustrates that lawn G is mowed by the mower deck 14 having this structure. FIG. 20 illustrates the longitudinal section of the mower deck 14 taken along the straight line L3 of FIG. 19A. When the electric lawn mower 10 travels in the forward direction F and the upper portion of lawn G, which is not yet mowed, comes into contact with the side surface 14S of a front end portion 14T of the mower deck 14, the upper portion of the lawn G is bent forward. Further, when the mower deck 14 moves forward by a predetermined distance, the upper portion of the lawn G is separated from the side surface 14S and returns to an erect posture. The reason for this is that the lawn G passes through the notch without coming into contact with the connecting portion 51'M and being bent. Since the width W3 of the connecting portion 51'M is smaller than the widths W2 of the guide plates 51'R and 51'L, the connecting portion 51'M does not come into contact with the lawn G.

Further, the mower deck 14 further moves forward while the lawn G is erected, and the upper portion of the grass G is cut by the rotating mower blade 40R' (or mower blade 40L') when the lawn G starts to approach the re-approach point P. The cut lawn G0 is carried upward by an air flow that is generated by the rotation of the mower blade 40R' (or the mower blade 40L'), and is discharged rearward from the opening 14E of the mower deck 14 by the air flow W (the lawn, which is shortened by being mowed, is denoted by reference numeral G'). In this way, when the mower deck 14 of this embodiment is used, it is possible to make the lawn G be erected at the closest point P. Accordingly, it is possible to appropriately cut the lawn G.

Next, a fifth embodiment will be described with reference to FIG. 21 to FIG. 24. An engine-driven lawn mower 300 is illustrated. In this embodiment, an engine E is used as a drive source for mower blades 40R' and 40L'. A lawn mower 300 is provided with the engine E at the front portion of a chassis 311. The engine E is covered with a hood BN. A steering column is provided so as to be continued to the rear portion of the hood BN, and a steering wheel S rotatably protrudes from the steering column. A cowl 320 is provided so as to be continued to the rear portion of the hood BN and so as to cover the chassis 311 from above. A driver's seat 321 is placed on the rear portion of the chassis 311.

Front tires 312 and 312 are provided on both sides of the front portion of the chassis 311, and rear tires 313 and 313 are provided on both sides of the rear portion of the chassis 311. Meanwhile, the rear tires 313 are used as driving wheels and a driving force generated from the engine E is transmitted to the rear tires 313 in this embodiment. A mower deck 314 is provided between the front and rear tires 312 and 313. Brackets 314A and 314B (see FIG. 22) are mounted on both sides of the front portion of the mower deck 314, and wheels W2 and W2 are rotatably provided on the brackets 314A and 314B by an axle (not illustrated). Wheels W1 and W1 are rotatably provided on both sides of the rear portion of the mower deck 314 by an axle (not illustrated). The rear portion of the mower deck 314 is suspended by suspension members 318A and 318B and the front portion of the mower deck 314 is suspended from the chassis 311 by suspension members (not illustrated). Meanwhile, since the rear portion of the mower deck 314 is opened, mowed grass can be discharged (so-called rear discharge type).

Hydraulic motor cases 323L and 323R are provided on the mower deck 314. Hydraulic motors (motors) ML and MR are provided in the hydraulic motor cases 323L and 323R, respectively. The hydraulic motors ML and MR are rotated by a working fluid from a hydraulic pump P1. An electromagnetic valve V2, which turns on and off the hydraulic circuit, is provided between a hydraulic pump P1 and the hydraulic motors ML and MR. The electromagnetic valve V2 opens and closes the hydraulic circuit by operating according to an instruction from a controller CL. Two electromagnetic valves V1 are mounted on the respective hydraulic motors ML and MR. It is possible to independently switch the rotational speeds of the hydraulic motors ML and MR to high speed/low speed by operating the respective electromagnetic valves V1. The electromagnetic valves V1 operate according to the instruction from the controller CL. Meanwhile, the engine E, the controller CL, the hydraulic pump P1, and the electromagnetic valves V1 and V2 are provided in the hood BN. Further, an operation button (not illustrated) that is used to open and close the electromagnetic valve V2 and two rotational speed buttons (not illustrated) that are used to operate the two electromagnetic valves V1 are provided near the driver's seat 321.

A driving force generated from the engine E is transmitted to the hydraulic pump P1, and a working fluid is sent from the hydraulic pump P1 and is filled in a hydraulic pipe. The hydraulic pipe is branched into two lines at the front portion thereof, and connection portions 322L and 322R are provided at the front ends of the branched hydraulic pipe. Further, the connection portions 322L and 322R are mounted on the hydraulic motors ML and MR. Meanwhile, output shafts of the respective hydraulic motors ML and MR protrude toward the inside of the mower deck 314. The output shafts of the respective hydraulic motors ML and MR are fixed to the rotation centers of the mower blades 40L' and 40R', respectively. Meanwhile, the rotation direction of the output shaft of the hydraulic motor ML is opposite to the rotation direction of the output shaft of the hydraulic motor MR, and the output shaft of the hydraulic motor ML rotates clockwise and the output shaft of the hydraulic motor MR rotates counterclockwise in a plan view. Further, the mower blades 40L' and 40R' are formed as illustrated in FIG. 9A and FIG. 9B.

In a plan view (FIG. 23), the rotation center of the mower blade 40L', which is positioned on the left side in a mower deck 314, is positioned obliquely on the left front side of the rotation center of the mower blade 40R' that is positioned on the right side (meanwhile, an arrow F represents the forward direction of the lawn mower 300). Specifically, a straight line L3, which is orthogonal to a straight line L1 connecting rotating shafts 315A and 315A of the two mower blades 40R' and 40L', is disposed so as to be tilted to the right side with respect to the forward direction F of the lawn mower 300 by an angle θ in a plan view (in other words, the straight line L1, which connects the rotation center of the left mower blade 40L' to the rotation center of the right mower blade 40R', is slightly tilted to the left front side (angle θ) with respect to a straight line L2 that represents the vehicle width direction of the lawn mower 300). Meanwhile, the paths TR and TL of rotation of the mower blades 40R' and 40L' are closest to each other with a short distance Δα on the straight line L1. Further, the middle point of the distance Δα is referred to as a closest point P. The short distance Δα between the paths TR and TL of rotation of the mower blades 40R' and 40L' at the closest point P may be appropriately set.

In this embodiment, the rotational speed of the hydraulic motor ML is set to be higher than the rotational speed of the hydraulic motor MR. That is, the rotational speed of the mower blade 40L', which rotates clockwise, is set to be higher than the rotational speed of the mower blade 40R' that rotates counterclockwise. This control is performed by pressing the rotational speed button (to be described above). It is possible to make the speed of an air flow WF1', which is generated by the rotation of the mower blade 40L', higher than the speed of an air flow WF2', which is generated by the rotation of the mower blade 40R', by making the rotational speeds of the mower blades 40L' and 40R' be different from each other. These two air flows WF1' and WF2' are combined with each other at the closest point P, so that a combined air flow WF' is generated. The combined air flow WF' is directed to the substantially right behind of the mower deck 314 (the substantially right behind of the lawn mower 300), and is discharged from an opening that is formed at the rear portion of the mower deck 314. At this time, an angle between the direction of a tangent line L3 of the two paths of rotation at the closest point P where the paths of rotation of the two mower blades 40L' and 40R' are closest to each other and the air flow WF' substantially becomes θ (which is substantially equal to an angle between the above-mentioned straight lines L1 and L2).

A component, which is parallel to the vehicle width direction, (a rightward component parallel to the straight line L2 in FIG. 23) of the velocity vector of the air flow WF1', which is generated by the mower blade 40L', is larger than a component, which is parallel to the vehicle width direction, (a leftward component parallel to the straight line L2 in FIG. 23) of the velocity vector of the air flow WF2' that is generated by the mower blade 40R'. Accordingly, the combined air flow WF' of the air flows WF1' and WF2' is not parallel to the tangent line L3 and is tilted counterclockwise by an angle θ.

Meanwhile, if the rotational speeds of the left and right hydraulic motors ML and MR are set to be equal to each other (that is, all of the hydraulic motors ML and MR rotate at a high speed or a low speed), the amount of air flow generated by the mower blade 40L' is substantially the same as the amount of air flow generated by the mower blade 40R'. In this case, a combined air flow is generated in the direction of the tangent line L3 of the two paths TL and TR of rotation at the closest point P. For this reason, it is not possible to discharge the mowed lawn to the right behind of the mower deck 314. In other words, in this embodiment, the speed of the air flow generated by the mower blade 40L' is increased so that the direction of the combined air flow is tilted from the direction of the tangent line L3 by an angle θ. Meanwhile, it is preferable that the rotational speed of the left mower blade 40L' be increased by 5 to 50% as compared to the rotational speed of the right mower blade 40R'. Further, hydraulic motors that can change the rotational speed in multiple stages may be applied instead of the hydraulic motors ML and MR of which the rotational speeds are switched to two stages, that is, low speed and high speed. In this case, the driver's seat 321 is provided with two dials that are used to set the rotational speeds of the left and right hydraulic motors.

Figure 24A:
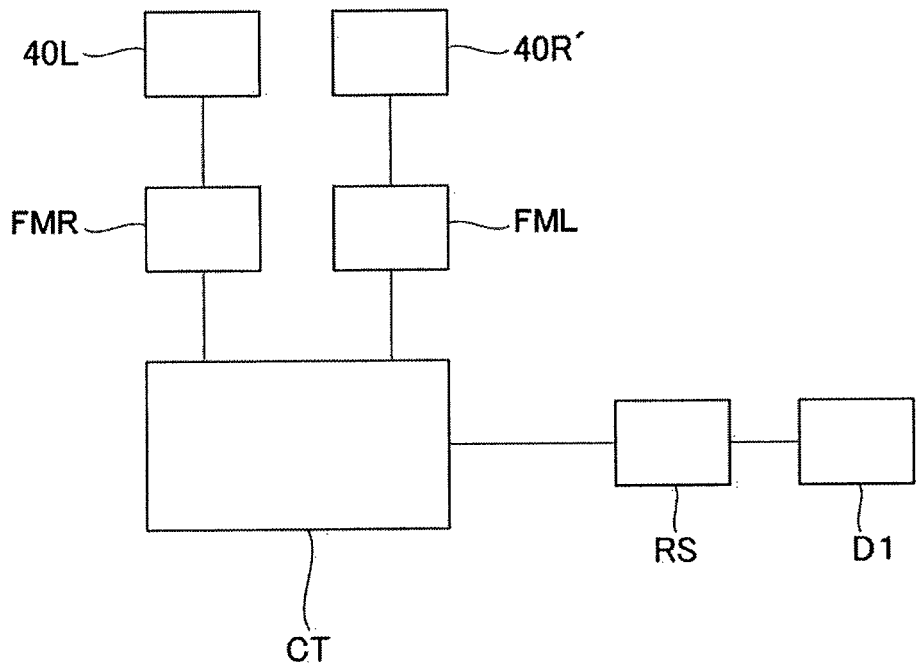
FIG. 24A is a block diagram illustrating a relation between a controller, a blade setting dial, and left and right mower blades.

Moreover, the embodiment, which is described with reference to FIG. 12A and FIG. 12B, may be applied to the lawn mower 300. In this case, a blade setting dial (adjusting unit) D1 is provided near the driver's seat 321 as illustrated in FIG. 24A. The blade setting dial D1 is used to set the periods of the rotational speeds of the mower blades 40L' and 40R' when periodically changing the rotational speeds of the mower blades 40L' and 40R', respectively. The blade setting dial D1 is formed in a disc shape, and a front end of a rotating shaft is fixed to the central portion of the blade setting dial D1. A rear end of the rotating shaft is rotatably mounted while being connected to a rotation sensor RS.

Since characters of "OFF" and "1" to "6" are written on the surface of the blade setting dial D1, it is possible to set the change periods of the rotational speeds of the mower blades 40L' and 40R' by making a mark portion, which is separately provided, correspond to one of the characters. When "OFF" of the blade setting dial D1 corresponds to the mark portion, the rotational speeds of the mower blades 40L' and 40R' are set so as not to be changed. When "1" of the blade setting dial D1 corresponds to the mark portion, the change periods of the rotational speeds of the mower blades 40L' and 40R' are set so as to be short. Numbers "2", "3", . . . "6" of the blade setting dial D1 are appropriately made to correspond to the mark portion in order to set the change periods of the rotational speeds of the mower blades 40L' and 40R' to a long period (accordingly, when "6" corresponds to the mark portion, the change periods of the mower blades 40L' and 40R' can be set to the longest period).

The rotation sensor RS is connected to a controller CT through harness. The rotation sensor RS detects the rotational position of the blade setting dial D1 and sends the detected rotational position to the controller CT. The signal sent from the controller CT is sent to each of two hydraulic motors FML and FMR of which the rotational speeds can be changed in multiple stages, so that the mower blades 40L' and 40R' are rotated.

Figure 24B:
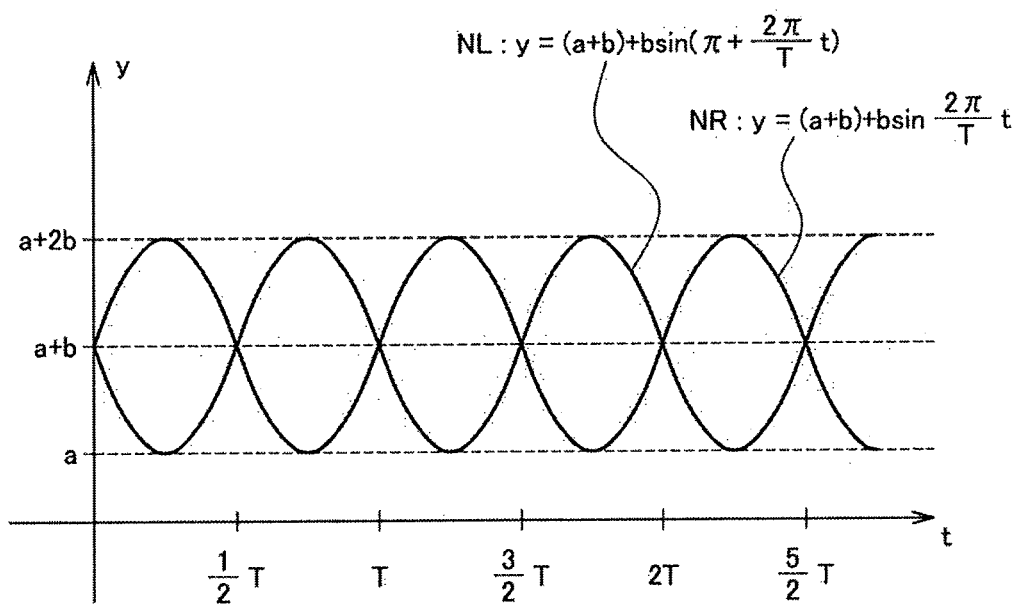
FIG. 24B is a diagram illustrating the periodic change of the rotational speeds of the left and right mower blades.

The controller CT controls the change periods and variation of the rotational speeds of the two hydraulic motors FML and FMR based on the signal sent from the rotation sensor RS. As illustrated in FIG. 24B, the variation of the rotational speed of the right hydraulic motor FMR is represented by a sine wave ($\sin(2\pi/T)$), the period is denoted by T, and the amplitude is denoted by b (b is a constant). Invariable rotational speed ((a+b) rpm, a is a constant) is added to the variation of the rotational speed, so that the rotational speed NR of the right hydraulic motor FMR is changed as $y (=(a+b)+b \sin(2\pi/T)$ rpm). That is, the right hydraulic motor FMR corresponds to the sum of the rotational speed ((a+b) rpm), which is the reference, and a variation ($y$ b $\sin(2\pi/T)$ rpm).

Meanwhile, the variation of the rotational speed of the left hydraulic motor FML is represented by a sine wave ($\sin[(2\pi/T)+\pi]$), the period is denoted by T, and the amplitude is denoted by b. Invariable rotational speed ((a+b) rpm) is added to the variation of the rotational speed, so that the rotational speed NL of the left hydraulic motor FML is changed as $y (=(a+b)+b \sin[(2\pi/T)+\pi]$ rpm). That is, the left hydraulic motor FML corresponds to the sum of the rotational speed ((a+b) rpm), which is the reference, and a variation ($y=b \sin[(2\pi/T)+\pi]$ rpm). As described above, the change period of the rotational speed of the left hydraulic motor FML is advanced relative to that of the rotational speed of the right hydraulic motor FMR by a half period. For this reason, it is possible to further increase a difference between the rotational speeds of the left and right hydraulic motors FML and FMR.

When the blade setting dial D1 is sequentially changed from "1" to "6", the periods T of the left and right hydraulic motors FML and FMR are sequentially shortened (reduced). Further, when the blade setting dial D1 corresponds to "OFF", the left and right hydraulic motors FML and FMR rotate at the invariable rotational speed ((a+b) rpm).

Meanwhile, the number of the mower blades, which are provided in the mower deck, is not limited to two, but may be two or more.

INDUSTRIAL APPLICABILITY

The riding mower of the invention is not limited to lawn mowing, but may be applied to every work for mowing grass. Further, the invention may be applied to any of a battery-driven lawn mower and an engine-driven lawn mower.

The invention claimed is:
1. A riding mower comprising:
two mower blades that rotate to mow grass and generate air flows, the two mower blades including a left mower blade and a right mower blade;
a mower deck that covers the two mower blades from above; and
two motors that rotate the respective mower blades,
the left and right mower blades being provided adjacent to each other and one of the left and right mower blades being disposed obliquely in front of the other mower blade,
the riding mower rotating the left mower blade clockwise and rotating the right mower blade counterclockwise in a plan view,
generating a combined air flow, which is directed to the rear from the front, in the mower deck at a position where the paths of rotation of the two mower blades are closest to each other, and
discharging mowed grass to the outside of the mower deck together with the combined air flow,
the riding mower further comprising
a controller,
wherein the controller controls such that a difference between the rotational speeds of the left and right mower blades is changed at a predetermined period and the mowed grass is discharged to the rear of the mower deck uniformly in a lateral direction of the mower deck.
2. The riding mower according to claim 1, further comprising
an adjusting unit that can change the period.
3. The riding mower according to claim 1,
wherein the rotational speed of the one mower blade is periodically changed and the rotational speed of the other mower blade is constant, so that the difference between the rotational speeds of the left and right mower blades is changed at a predetermined period.
4. The riding mower according to claim 1,
wherein the rotational speeds of both the left and right mower blades are periodically changed, so that the difference between the rotational speeds of the left and right mower blades is changed at a predetermined period.
5. The riding mower according to claim 2,
wherein the rotational speed of the one mower blade is periodically changed and the rotational speed of the other mower blade is constant, so that the difference between the rotational speeds of the left and right mower blades is changed at a predetermined period.
6. The riding mower according to claim 2,
wherein the rotational speeds of both the left and right mower blades are periodically changed, so that the difference between the rotational speeds of the left and right mower blades is changed at a predetermined period.

7. The riding mower according to claim 1, further comprising
a battery,
wherein the riding mower travels by the battery,
the two motors, which rotate the mower blades, are driven by the battery, and
the motors are placed on the mower deck.

8. The riding mower according to claim 2, further comprising
a battery,
wherein the riding mower travels by the battery,
the two motors, which rotate the mower blades, are driven by the battery, and
the motors are placed on the mower deck.

9. The riding mower according to claim 3, further comprising
a battery,
wherein the riding mower travels by the battery,
the two motors, which rotate the mower blades, are driven by the battery, and
the motors are placed on the mower deck.

10. The riding mower according to claim 4, further comprising
a battery,
wherein the riding mower travels by the battery,
the two motors, which rotate the mower blades, are driven by the battery, and
the motors are placed on the mower deck.

11. The riding mower according to claim 1, further comprising
an engine,
wherein the riding mower travels by the engine, and
the two motors, which rotate the mower blades, are hydraulic motors that are driven by the engine.

12. The riding mower according to claim 2, further comprising an engine, wherein the riding mower travels by the engine, and the two motors, which rotate the mower blades, are hydraulic motors that are driven by the engine.

13. The riding mower according to claim 3, further comprising an engine, wherein the riding mower travels by the engine, and the two motors, which rotate the mower blades, are hydraulic motors that are driven by the engine.

14. The riding mower according to claim 4, further comprising an engine, wherein the riding mower travels by the engine, and the two motors, which rotate the mower blades, are hydraulic motors that are driven by the engine.

15. The riding mower according to claim 1, wherein the mowed grass is fully discharged by the left and right mower blades to the rear of the mower deck uniformly in the lateral direction of the mower deck.

* * * * *